(12) United States Patent
Gretz

(10) Patent No.: US 9,748,751 B1
(45) Date of Patent: Aug. 29, 2017

(54) ELECTRICAL BOX ASSEMBLY FOR ANGLED RECESSED MOUNTING OF HIGH AND LOW VOLTAGE COMPONENTS

(71) Applicant: Thomas J. Gretz, Port St. Lucie, FL (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 388 days.

(21) Appl. No.: 13/944,426

(22) Filed: Jul. 17, 2013

Related U.S. Application Data

(63) Continuation-in-part of application No. 13/134,341, filed on Jun. 6, 2011, now Pat. No. 8,569,619, and a continuation-in-part of application No. 12/928,223, filed on Dec. 7, 2010, now Pat. No. 8,476,525.

(60) Provisional application No. 61/675,574, filed on Jul. 25, 2012.

(51) Int. Cl.
*H02G 3/10* (2006.01)

(52) U.S. Cl.
CPC ..................... *H02G 3/10* (2013.01)

(58) Field of Classification Search
CPC ........ H02G 3/088; H02G 3/081; H02G 3/086; H02G 3/123; H02G 3/14; H02G 3/10; H02G 3/12; H02G 3/16; H02G 3/20; H02G 15/06; H02G 3/08; H02G 3/0431; H02G 3/00; H05K 5/0004; H05K 1/181; H05K 1/182; H05K 3/301; H05K 7/1461; H05K 5/00; H05K 5/02; H05K 5/0052; H05K 9/0007; H01H 9/02; H02B 1/40; A01K 97/10; E04H 12/32; H01Q 1/1221
USPC ....... 174/520, 535, 560, 563, 54, 58, 61, 67, 174/53, 50, 17 R, 60, 63, 64, 559, 480, 174/481; 220/3.2, 3.3, 3.92, 3.94, 4.02; 248/535, 536
See application file for complete search history.

(56) References Cited

U.S. PATENT DOCUMENTS

| 5,350,884 A | * | 9/1994 | Littrell .................. H02G 3/185 174/489 |
| 5,397,929 A | * | 3/1995 | Hogarth ................ H01R 27/02 307/140 |
| 5,419,716 A | * | 5/1995 | Sciammarella et al. ... 439/540.1 |
| 5,957,556 A | * | 9/1999 | Singer et al. ............. 312/223.6 |
| 5,965,844 A | * | 10/1999 | Lippa ...................... H02G 3/14 174/481 |
| 6,147,304 A | | 11/2000 | Doherty |

(Continued)

*Primary Examiner* — Pete Lee

(57) ABSTRACT

An electrical device mounting assembly adapted for mounting of power and low voltage components in a shallow wall cavity to supply a television or similar electronic device. The mounting assembly recesses all high and low voltage components behind the wall surface to render them unobtrusive and out of the way. The mounting assembly includes a mounting frame with a peripheral flange, sidewalls, and a rear wall. A corner of the mounting frame is adapted to mount a duplex receptacle at an oblique angle with respect to the sidewalls. The mounting frame includes cable tie-offs for routing cables and at least one low voltage mount for the mounting of low voltage components. The mounting assembly enables consolidation of all power and signal hookups for TV or home entertainment systems in a single assembly that is recessed within the wall and allows flush wall mounting of a flat panel TV.

11 Claims, 19 Drawing Sheets

(56) References Cited

U.S. PATENT DOCUMENTS

| | | |
|---|---|---|
| 7,038,132 B1 | 5/2006 | Lowe et al. |
| 7,078,618 B2 | 7/2006 | Dinh |
| 7,304,236 B1 | 12/2007 | Gretz |
| 7,595,446 B2 * | 9/2009 | Turcovsky et al. ............. 174/50 |
| 8,049,107 B2 * | 11/2011 | Dinh ............................... 174/53 |
| 8,097,805 B2 * | 1/2012 | Drane ...................... H02G 3/12 |
| | | 174/50 |
| 2010/0051308 A1 * | 3/2010 | Hansen et al. ............... 174/50.5 |
| 2011/0209913 A1 * | 9/2011 | Green et al. .................. 174/520 |

* cited by examiner

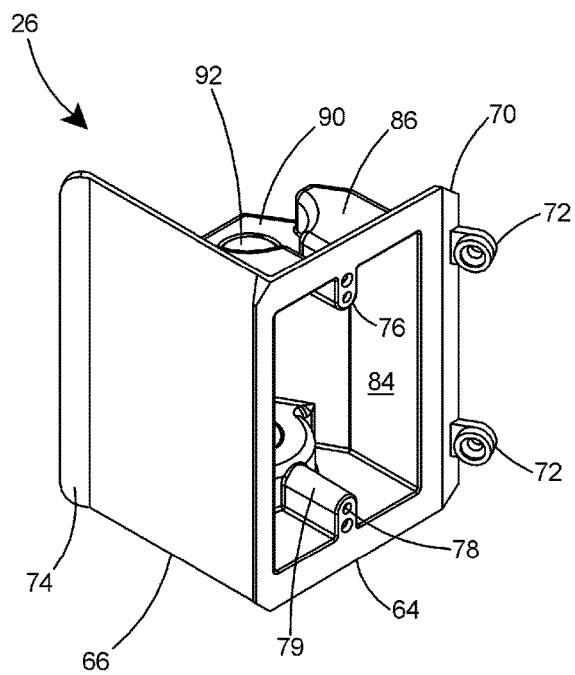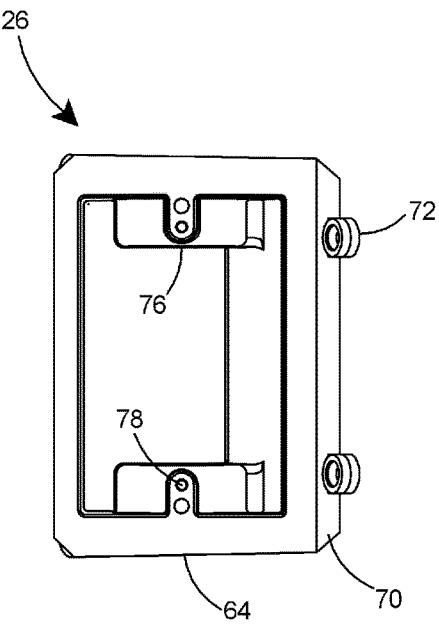
Fig. 9    Fig. 10
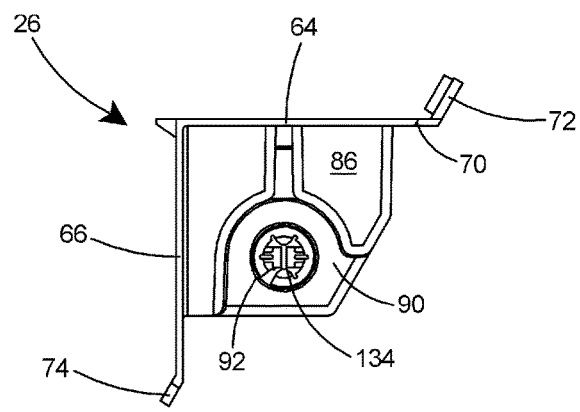
Fig. 11

ELECTRICAL BOX ASSEMBLY FOR ANGLED RECESSED MOUNTING OF HIGH AND LOW VOLTAGE COMPONENTS

CROSS-REFERENCE TO RELATED APPLICATIONS

This application claims priority to provisional U.S. Application No. 61/675,574, filed Jul. 25, 2012, and is a Continuation-In-Part of U.S. patent application Ser. No. 13/134,341, filed on Jun. 6, 2011, which is a Continuation-In-Part of U.S. patent application Ser. No. 12/928,223, filed on Dec. 7, 2010 entitled "Electrical Device Mounting Assembly for Angled Mounting of High and Low Voltage Components, the contents of which are incorporated herein by reference in their entireties.

FIELD OF THE INVENTION

This invention relates to electrical box assemblies for mounting components for high and low voltage devices and specifically to an electrical device mounting assembly that can be quickly and easily installed on a wall of a building and provide high and low voltage components connections to a television, computer, home stereo system, intercom, security system controller, or other electrical device that requires both high and low voltage connections.

BACKGROUND OF THE INVENTION

With the proliferation of flat panel televisions and various auxiliary devices, such as digital videodisc players, game stations, and surround sound systems, there is a need to manage the connections between these devices to ensure there is adequate power and also to manage the myriad cables and cords that accompany such systems. Conventional electrical boxes have proven inadequate for these devices as they mount the high and low voltage connections for these components flush with the wall, which makes the plugs or connectors that mate with the wall-mounted components protrude from the wall thereby making it difficult to mount an electrical device such as a television close to the wall. Electrical plugs or cords that extend from the wall are also susceptible to damage, such as from vacuum cleaners or other household hazards which may brush against the plugs or cords.

What is needed therefore is a multifunctional electrical device mounting assembly that provides connection points for both high and low voltage components, provides isolation of high voltage connections from low voltage connections, provides features for managing the plethora of cables and wiring associated with modern television systems, and recesses the end connector of cords or cables to protect the plug ends of cords or end connectors of cables from undesirable contact with household appliances or household occupants. Furthermore, for electrical mounting assemblies that recess the ends of electrical cords within the wall, it is desirable to minimize the depth of the mounting assemblies to minimize the size and cost of manufacturing such assemblies and also to enable the mounting assemblies to fit within substantially narrow wall cavities. What is also needed is an electrical device mounting assembly that is configurable by the installer to meet the multifunctional needs of the particular electrical device that it is used with.

Parent U.S. patent application Ser. No. 13/134,341, filed on Jun. 6, 2011, which has been incorporated herein by reference, disclosed an electrical device mounting assembly that that included ports for entry of low voltage cables and an angled mounting surface for connection of a duplex receptacle at the opposing end. The duplex receptacle mounted at an angle of approximately 60° with respect to the front of the mounting assembly thereby advantageously minimizing the depth of the mounting assembly and enabling its use in shallow wall cavities.

Although the mounting assembly of the parent application advantageously reduced the depth of the electrical device mounting assembly, there continue to be applications such as recreational vehicles (RVs), in which the walls are typically formed with 2×3-inch studs and are therefore much shallower than for a conventional wall framed with 2×4-inch studs. A cavity formed in such a wall in a retrofit situation is substantially shallow and will not accommodate a conventionally mounted electrical box. In such a case it is necessary to further reduce the depth of the mounting assembly such that it will fit within the shallow wall cavity.

What is needed therefore is a mounting assembly that can be secured within a shallow wall cavity while still providing mounting points for both high and low voltage components.

SUMMARY OF THE INVENTION

The invention is a shallow depth electrical device mounting assembly that provides mounting locations for power and low voltage components to supply a television or similar electronic device. The mounting assembly recesses all high and low voltage components behind the wall surface to render them unobtrusive and out of the way. The mounting assembly includes a mounting frame with a peripheral flange, sidewalls, and a rear wall. One corner of the mounting frame is adapted to mount a duplex receptacle at a 45° angle with respect to the sidewalls, thereby reducing the depth of the mounting frame while providing sufficient space for recessing plug ends of electrical cords therein. The sidewalls of the mounting frame include at least one low voltage mount with reinforced perimeters for the mounting of low voltage components. The low voltage mounts are capable of accepting standard jacks for broadband cable, direct TV, surround sound cabling, or phone systems. The mounting assembly enables easy consolidation of all the various power and signal hookups for TV or home entertainment systems in a single assembly that is recessed within the wall and allows flush mounting of a flat panel TV or similar electronic device directly over the mounting assembly. Rotatable clamp arms on the mounting frame enable easy wall preparation to facilitate rapid installation to the sheet rock of a building.

OBJECTS AND ADVANTAGES

The electrical device mounting assembly of the present invention provides several advantages over the prior art, including:

(1) The mounting assembly can be configured to provide all of the hookups for a flat panel TV or similar device, including power and low voltage wiring and cables.

(2) By adapting one corner of the mounting frame to for the mounting of a duplex receptacle at a 45° angle with respect to the sidewalls, the depth of the mounting frame is substantially reduced.

(3) The mounting assembly provides sufficient space for recessing plug ends of electrical cords therein.

(4) The depth of the mounting assembly and enables it to be used in shallow wall cavities.

(5) The mounting assembly recesses electrical components and the plug ends of cords or end connectors of cables within the wall surface to render them unobtrusive and out of the way.
(6) Recessing the electrical components within the wall enables flush mounting the recipient electrical device, such as a television, against the wall.
(7) Rotatable clamp arms to enable an installer to rapidly prepare the wall and flush mount the assembly to a wall.
(8) The mounting assembly is a one-gang box that is ideal for supplying power and AV signals to the latest small LCD TVs, which typically have power at one corner and AV inputs at the other corner.
(9) Integral cable guides enable efficient routing of cables and wiring within the mounting assembly thereby providing a clean installation that bundles wires and cables along the corners at the rear wall of the mounting frame.

These and other objects and advantages of the present invention will be better understood by reading the following description along with reference to the drawings.

DESCRIPTION OF THE DRAWINGS

FIG. 9 is a perspective view of a high voltage box that forms a portion of the electrical device mounting assembly of FIG. 1.

FIG. 10 is a side view of the high voltage box of FIG. 9.

FIG. 11 is an end view of the high voltage box as viewed from the bottom of FIG. 9.

DETAILED DESCRIPTION OF THE INVENTION

Figure 1:
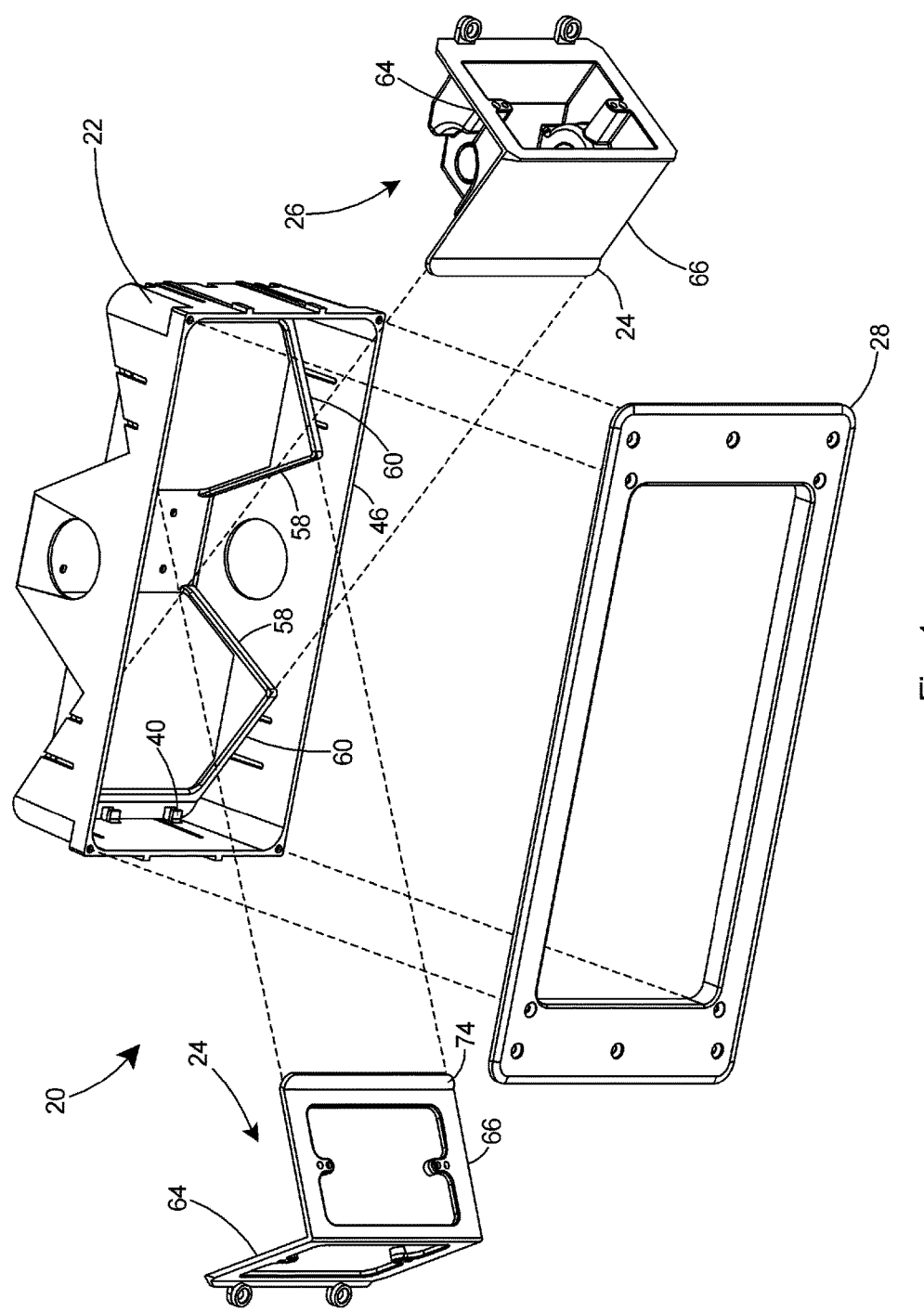
FIG. 1 is an exploded perspective view of a first embodiment of an electrical device mounting assembly according to the present invention.
Figure 2:
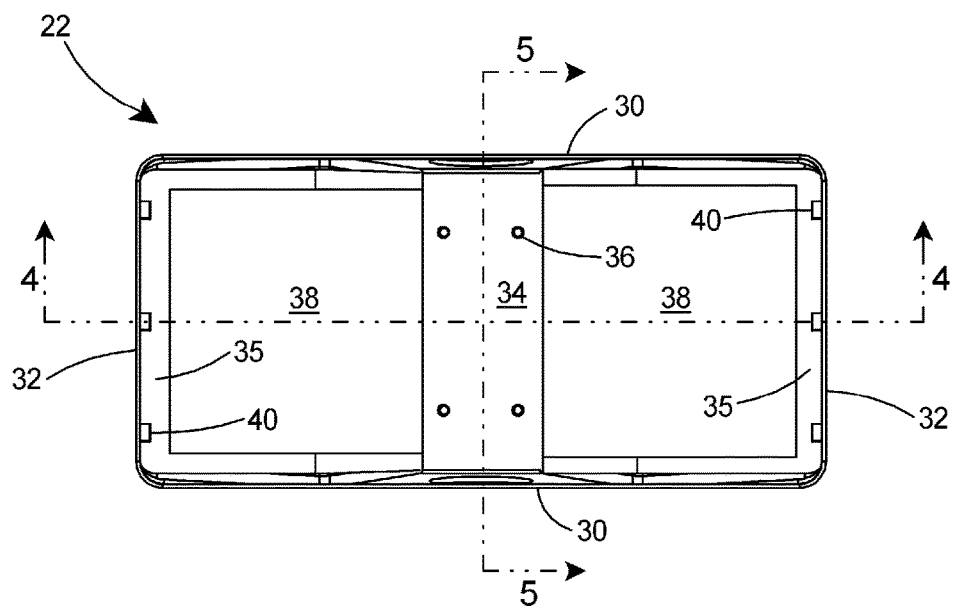
FIG. 2 is a front view of a mounting frame that forms a portion of the electrical device mounting assembly of FIG. 1.
Figure 3:
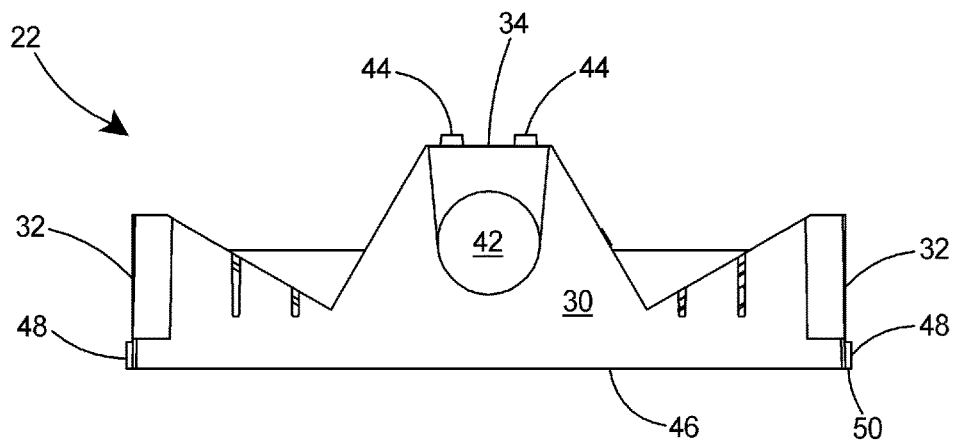
FIG. 3 is a side view of the mounting frame as viewed from the top side of FIG. 2.

With reference to FIG. 1 there is shown a first embodiment of an electrical device mounting assembly 20 according to the present invention. The electrical device mounting assembly 20 includes a mounting frame 22, two mounting devices including a low voltage mounting plate 24 and a high voltage box 26, and a trim plate 28.

Figure 4:
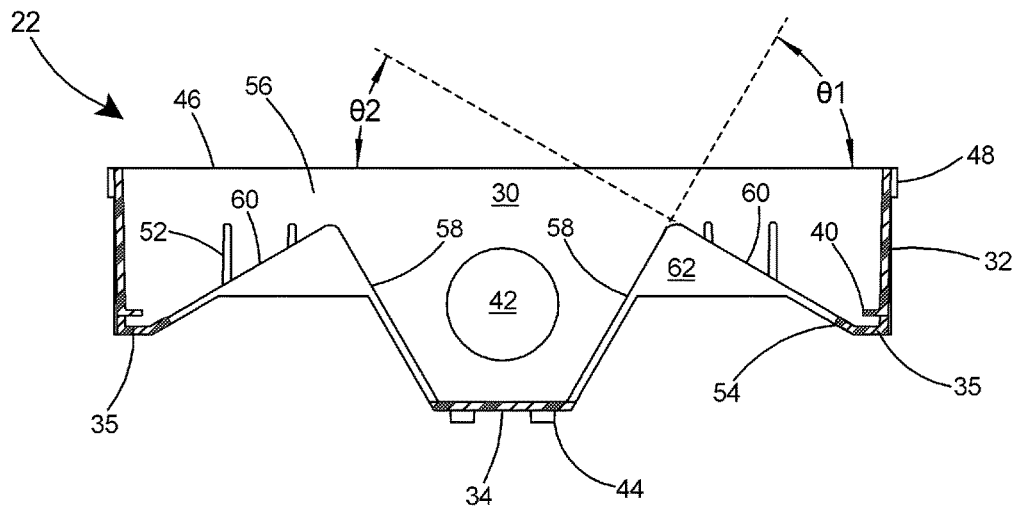
FIG. 4 is a sectional view of the mounting frame taken along line 4-4 of FIG. 2.
Figure 5:
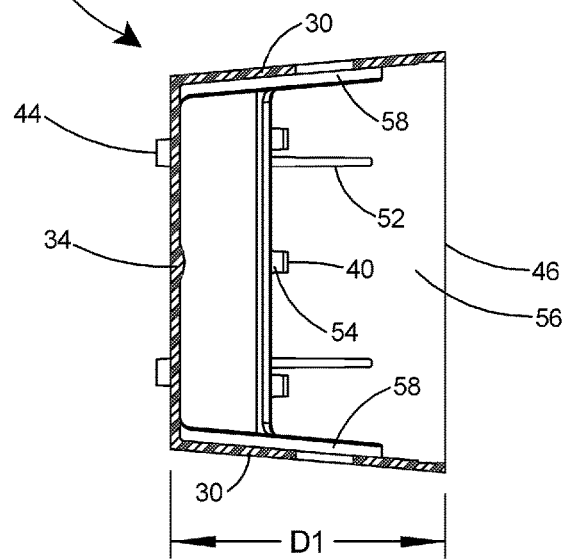
FIG. 5 is a sectional view of the mounting frame taken along line 5-5 of FIG. 2.

Referring to FIGS. 2-5, the mounting frame 22 has walls 30 and 32 including two side walls 30 and two end walls 32, a back wall 34 extending over a portion of the rear of the mounting frame 22 at its center and two corner walls 35. Several apertures 36 are provided in the back wall 34. Two large open areas 38 are provided on either side of the partial back wall 34 and a plurality of tabs 40 are provided on the mounting frame 22 extending inward from the end walls 32. The side walls 30 include cable openings 42 therein and the back wall 34 includes bosses 44 that are coincident with the apertures 36 in the back wall. The side walls 30 and end walls 32 of the mounting frame 22 terminate in a planar front face 46. Integral spacers 48 extend outwards from the end walls 32 and each include a flat front face 50 that is planar with the front face 46 of the mounting frame 22. The integral spacers 48 are preferably ½-inch in length and thereby enable an installer to rapidly and accurately orient the mounting frame 22 with respect to a stud (not shown) in a new work situation in order to properly allow the proper spacing for applying conventional ½-inch drywall over the stud. A plurality of slots 52 are provided in the side walls 30 and end walls 32 of the mounting frame 22. The tabs 40 are offset from the corner walls 35 thereby creating a gap 54 there between. As shown in FIG. 4, the mounting frame 22 includes an enclosure 56 defined by the side walls 30 and end walls 32 and a plurality of braces 58 and second braces 60 extending from each of the side walls 30 into the enclosure 56. Each brace 58 is at an angle of Θ1 with respect to the front face 46 and each second brace 60 is at an angle of Θ2 with respect to the front face 46. As will be described herein, it is critical to the present invention that the braces 58 and second braces 60 are each at an angle with respect to the front face 46 of the mounting frame 22 as this will insure that multiple component housings (not shown) can be mounted within the mounting frame 22 while minimizing the depth of the mounting frame 22 with the depth of the mounting frame 22 being defined as the distance between the front face 46 and the back wall 34 and shown as distance D1 in FIG. 5. Most preferably, the depth D1 of the mounting frame 22 according to the present invention is 3.8-inches, which depth is kept to a minimum by orienting the mounting devices 24 and 26 at an angle with respect to the front face 46 of the mounting frame 22. Thus, the mounting of the mounting devices 24 and 26 at the desired angle achieves the unexpected results of enabling the fitting of a substantial number of mounting devices 24 and 26 in a mounting assembly 20 that extends a relatively short distance into the wall while still providing space for recessing the installed electrical components and any connected electrical cord plugs. As shown in FIG. 4, the braces 58 and 60 are formed by substantially triangular-shaped raised areas 62 in the side walls 30 of the mounting frame 22. The raised areas 62 extend from both the top and bottom side walls 30 and provide the bracing surfaces 58 and 60 thereon.

Figure 6:
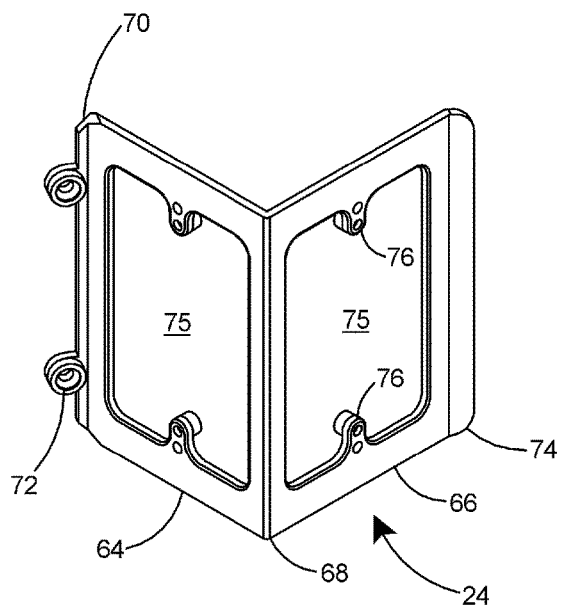
FIG. 6 is a perspective view of a low voltage plate that forms a portion of the electrical device mounting assembly of FIG. 1.
Figure 7:
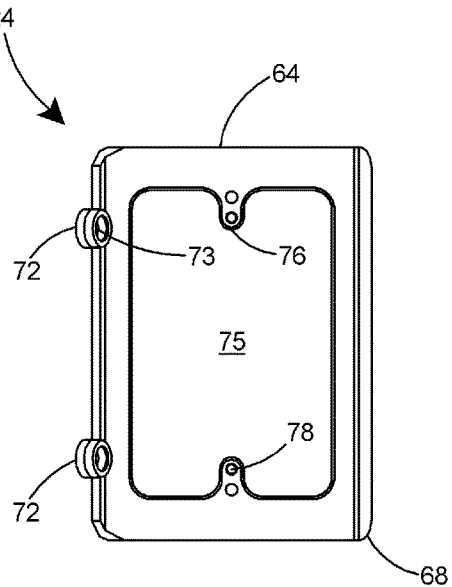
FIG. 7 is a side view of the low voltage plate of FIG. 6.
Figure 8:
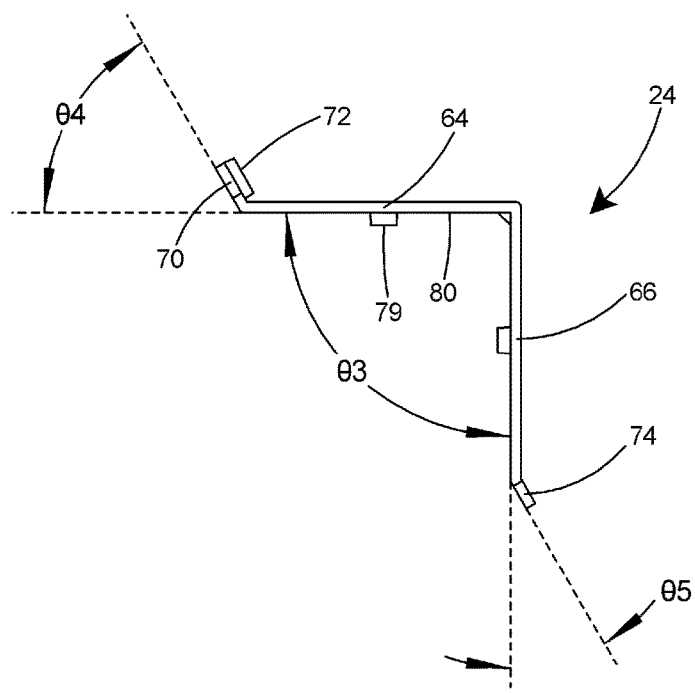
FIG. 8 is an end view of the low voltage plate of FIG. 6.

With reference to FIGS. 6-8 there is shown a low voltage mounting plate 24 that may form a portion of an electrical device mounting assembly according to the present invention. The low voltage mounting plate 24 includes a first frame 64 and a second frame 66 integral with one another at a corner wall 68. The frames 64 and 66 are at an angle Θ3 with respect to one another, which angle is preferably between 60 and 120 degrees and more preferably is 90 degrees, as depicted in FIG. 8. A first lip 70 extends at an angle Θ4 from the first frame 64 and two mounting bosses 72 having mounting bores 73 therein extend from the first lip 70. The second frame 66 also includes a second lip 74 extending there from with the second lip 74 extending at an angle Θ5 from the second frame 66. When the angle Θ3 of the first frame 64 with respect to the second frame 66 is 90 degrees, the angle Θ4 of the first lip 70 with respect to the first frame 64 is preferably 60 degrees and the angle Θ5 of the second lip 74 with respect to the second frame 66 is preferably 30 degrees. The frames include frame openings 75 therein. Component connection points 76 extend into the frame openings 75 and include component bores 78 therein. The component connection points 76 include component bosses 79 extending from the back side 80 of the low voltage mounting plate 24. A filet 82 is provided on the back side 80 of the low voltage mounting plate 24 extending between the frames 64 and 66. When the low voltage mounting plate 24 is molded of plastic, the filet 82 is molded integrally with the low voltage mounting plate 24 and adds strength to the plate 24 at the point where the two frames 64 and 66 meet.

Referring to FIGS. 9-11, the high voltage box 26 includes many elements in common with the low voltage frame including a first frame 64, second frame 66, first lip 70, second lip 74, mounting bosses 72, and component connection points 76. The high voltage box 26 also includes a sidewall 84 and end walls 86 that cooperate with the second frame 66 to provide an electrical box enclosure 88 for accepting a high voltage electrical component (not shown) therein. A recessed area 90 is provided in each end wall 86 with a knockout 92 provided in each recessed area.

Figure 12:
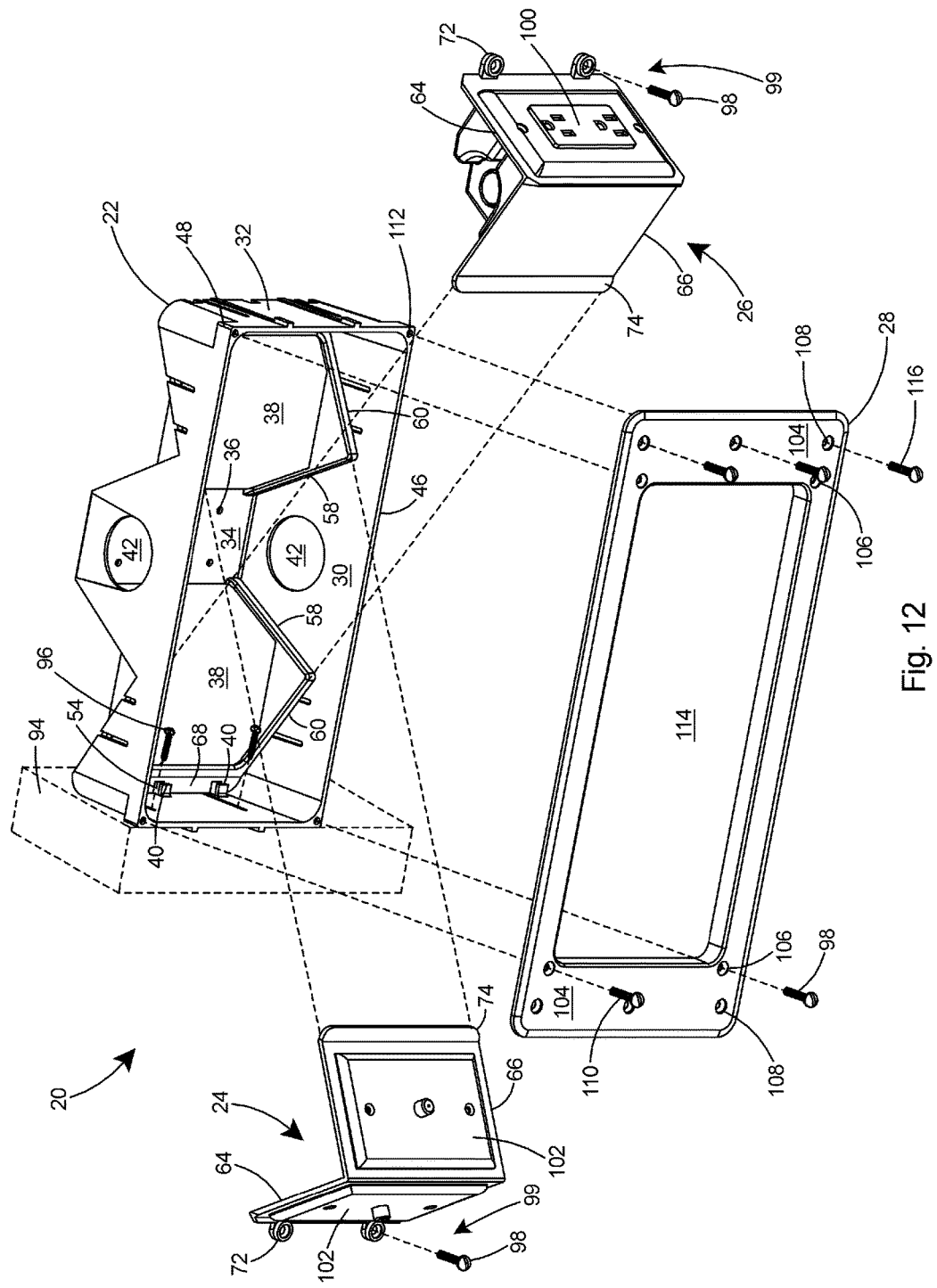
FIG. 12 is an exploded perspective view of the electrical device mounting assembly of the present invention including a high voltage component mounted in the high voltage box and two low voltage components mounted in the low voltage plate.

Reference is made to FIG. 12 for an explanation of the operation of the electrical device mounting assembly 20 of the present invention. The electrical device mounting assembly 20 can be mounted to a wall and configured to hold two high voltage electrical boxes 26, two low voltage mounting plates 24, or one high voltage electrical box and one low voltage mounting plate. Thus, the electrical device mounting assembly can be configured to provide the proper amount of high and low voltage connection points depending on the needs of the situation. The particular arrangement depicted in FIG. 12 depicts the electrical device mounting assembly 20 being configured to hold one high voltage electrical box 26 and one low voltage mounting plate 24. The electrical device mounting assembly can be used for either new work, where sheetrock has not been installed over the studs, or old work situations. For an old work installation, a portion of the existing sheetrock is removed, typically between two studs, in the location where electrical services are required. One end of the electrical device mounting assembly 20 is typically secured to a stud 94 with fasteners 96 as shown.

After the electrical device mounting assembly 20 is secured at one end to the stud 94, the assembly may be configured with two low voltage plates, two high voltage boxes, or one of each as desired. The high voltage box 26 and low voltage plate 24 can be installed into the electrical device mounting assembly 20 in any order by sliding the second lip 74 of the second frame 66 into the gaps 54 between the tabs 40 and corner wall 68. The tabs 40 perform a critical function for the electrical device mounting assembly 20 as they enable an installer to rapidly configure the box with mounting devices 24 and 26. The tabs 40 enable the mounting device 24 or 26 to easily seat in its proper place in the box assembly 20 as the tabs 40 enable the second lip 74 of the mounting device to slide into the gaps 54 formed by the tabs. Brace 58 and second brace 60 of mounting frame 22 brace and support the first frame 64 and second frame 66 respectively of the low voltage mounting plate 24 and high voltage box 26 when they are inserted into the mounting frame 22 and position the frames 64 and 66 at the desired angle with respect to the front face 46 of the mounting frame 22. The mounting devices 24 and 26 are then secured to the mounting frame 22 by driving fasteners 98 through bosses 72 of mounting devices 24 and 26 into apertures 36 in the back wall 34 of mounting frame 22. Fasteners 98 and bosses 72 therefore form an attachment arrangement 99 for securing the mounting devices 24 and 26 within the enclosure 56 of the mounting frame 22. In FIG. 12, the high voltage box 26 is depicted with a duplex receptacle 100 installed therein and low voltage mounting plate 24 is depicted with two CATV connector plates 102 installed therein. The installation is completed by securing trim plate to the mounting frame 22. Trim plate 28 includes two end flanges 104 with inner apertures 106 and outer apertures 108 therein. After the mounting frame 22 has been configured, fasteners 110 are driven into bores 112 in each corner of the front face 46 of the mounting frame 22. The high and low voltage electrical components 100 and 102 will then be accessible through the opening 114 in trim plate 28. After the trim plate 28 is secured to the mounting frame 22, mounting fasteners 116 may be driven through the end flange 104 opposite the stud 94 to secure the opposing end of the electrical device mounting assembly 20 to the wall.

Figure 13:
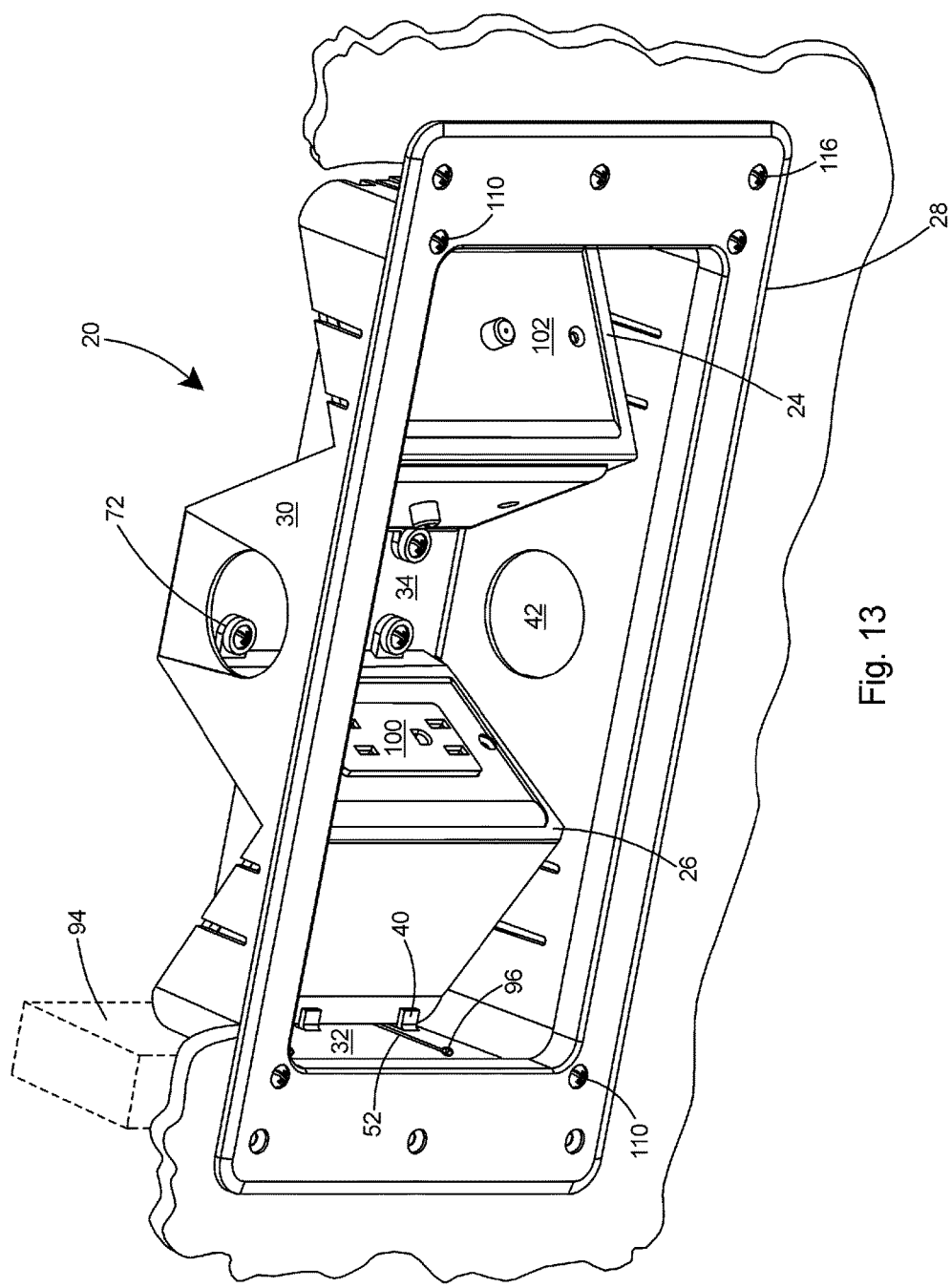
FIG. 13 is a perspective view of the electrical device mounting assembly of the present invention mounted to a wall and with a high voltage component and two low voltage components mounted therein.

The completed electrical device mounting assembly 20 is depicted in FIG. 13. A low voltage mounting plate 24 has been installed in the right side of the assembly and a high voltage box 26 has been installed in the left side of the assembly. If an alternative arrangement of high and low voltage components is desired, the electrical device mounting assembly 20 may be configured with two high voltage boxes or with two low voltage mounting plates in lieu of one of each type electrical mounting device.

Figure 14:
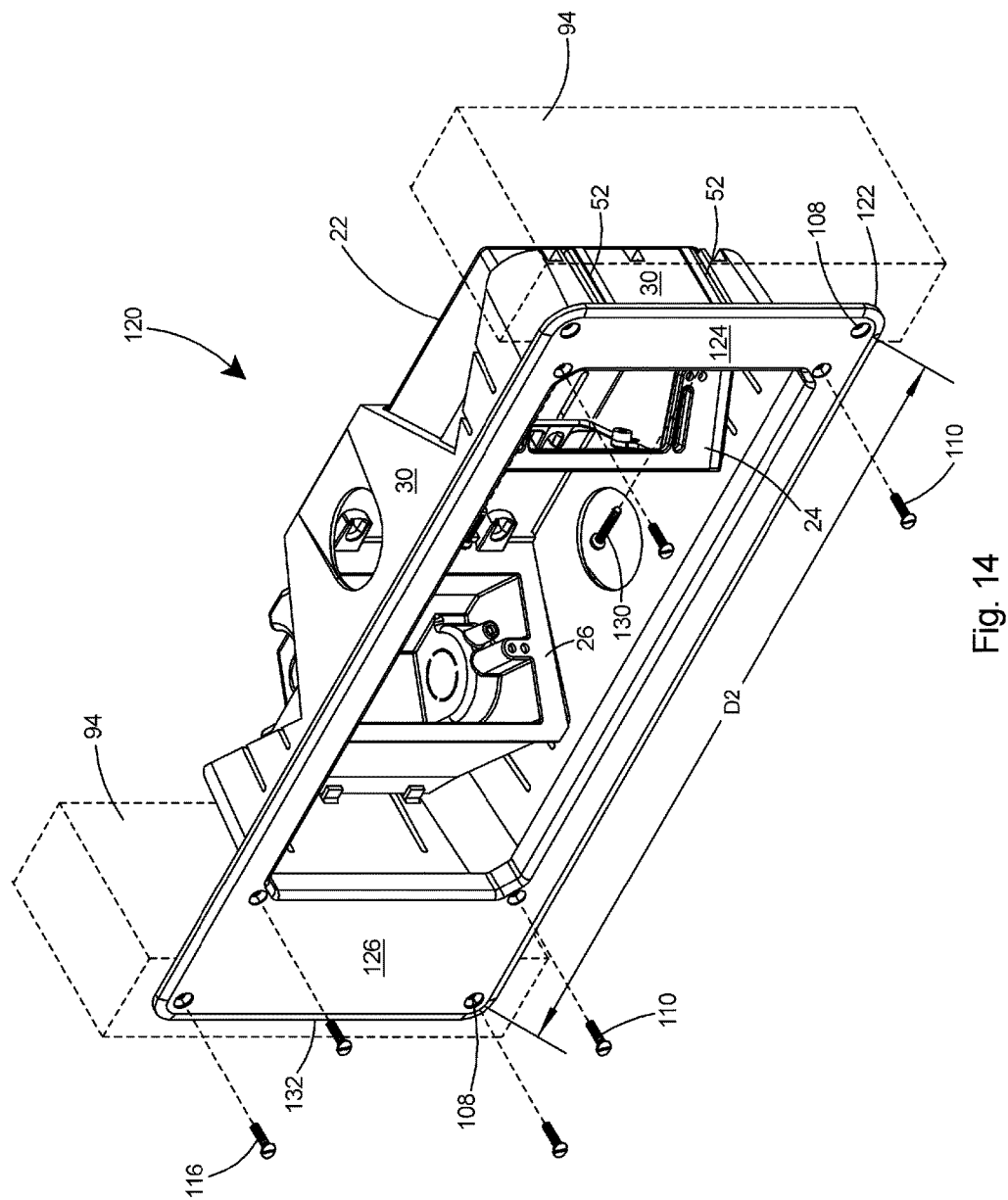
FIG. 14 is a perspective view of a second embodiment of an electrical device mounting assembly according to the present invention mounted to a wall.

With reference to FIG. 14 there is shown a second embodiment of an electrical device mounting assembly 120. Mounting assembly 120 includes a mounting frame 22, low voltage mounting plate 24, and high voltage box 26 similar to the first embodiment. Mounting assembly 120 however includes a trim plate 122 in which the end flanges are nonsymmetrical including a first end flange 124 and a second end flange 126. As shown in FIG. 14, the second end flange 126 is wider than the first end flange 124. Trim plate 122 is sized to provide spacing equal to the standard spacing between studs. The spacing, denoted by D2 in FIG. 14, is preferably 16-inches between the outer apertures 108 in the end flanges 124 and 126 to match the conventional center-to-center spacing between adjacent studs. The distance between sidewall 30 of mounting frame 22 and the outer aperture 108 of first end flange 124 is approximately half the width of a conventional stud 94. Thus the mounting frame 22 can be jammed against a stud 94 and secured thereto with fasteners 130 driven through slots 52 in sidewall 30 into stud 94. After the low voltage mounting plate 24 and high voltage box 26 are installed in the mounting frame 22, trim plate 122 is secured to the mounting frame 22 by fasteners 110. The opposite end 132 of the trim plate 122 is then secured to the opposite stud 94 with fasteners 116. The second embodiment of the trim plate 122 according to the present invention therefore provides the ability to anchor the electrical device mounting assembly 120 to a stud 94 at both ends of the assembly, thereby providing an electrical device mounting assembly 120 that is secured at both ends to the wall.

As shown in FIG. 11, the high voltage box 26 may include a knockout or removable wall portion 92 therein in the recessed area 90 in one of the end walls 86. The recessed area 90 in the sidewall 86 enables the use of electrical fittings or connectors such as the Black Button™ push-in fitting or connector 134 for connecting non-metallic cable to electrical boxes, which connector 134 is available from Arlington Industries of Scranton, Pa. The recessed area 90 permits use of the connectors 134 while preventing the connectors from projecting beyond the sidewall 86 and interfering with placement of the electrical device mounting assembly 20 in locations where space is tightly restricted.

Figure 15:
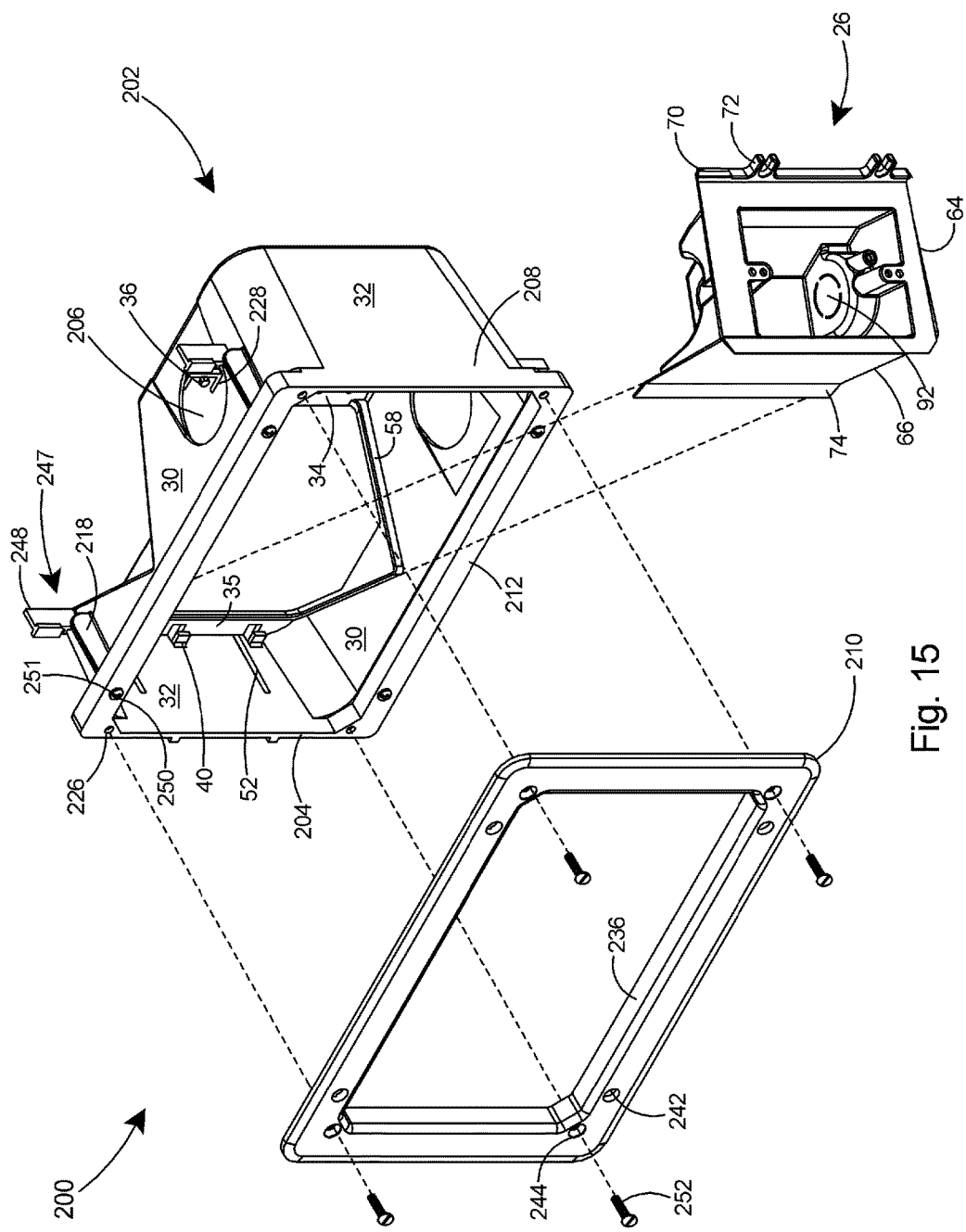
FIG. 15 is an exploded perspective view of a third embodiment of an electrical device mounting assembly according to the present invention.

With reference to FIG. 15 there is shown a third embodiment of an electrical device mounting assembly 200 according to the present invention. In the figures that depict assembly 200, the same reference numerals will be used to denote any elements that are in common with those of the first embodiment. Electrical device mounting assembly 200 includes a mounting frame 202 with a brace 58 extending from the sidewall 30 toward a first end 204 of the mounting frame 202, large ports 206 for entry of low voltage cables (not shown) at the second end 208 of the mounting frame 202, and a trim plate 210 that is secured to an elongated flange 212 that extends from the sidewalls 30 of the mounting frame 202. The brace 58 can be configured to accept an electrical component mounting device, which, depending on the user's preference, can be either a low voltage mounting plate 24 (see FIGS. 6-8) or a high voltage box 26 (see FIGS. 9-11). The mounting frame 202 in FIG. 15 is depicted as being configured with a high voltage box 26.

Figure 16:
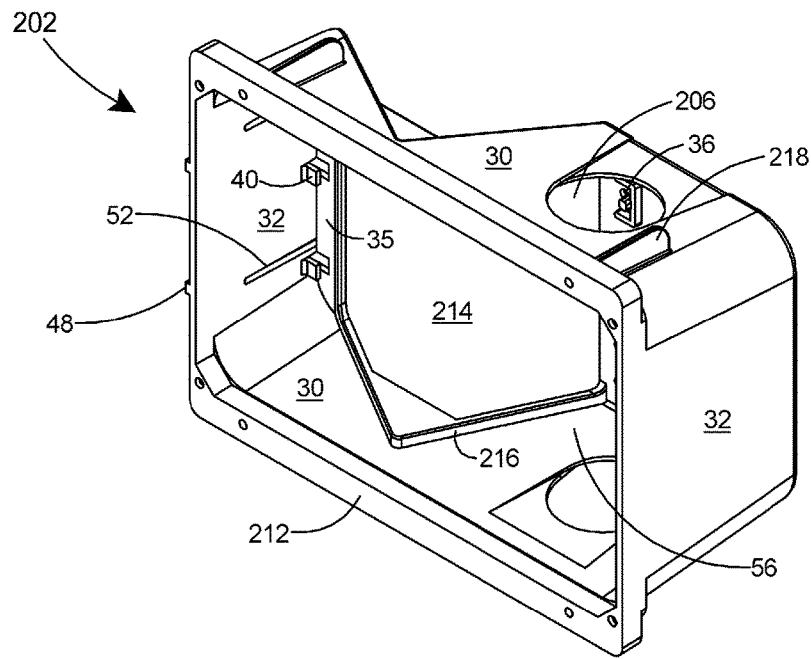
FIG. 16 is a front perspective view of a mounting frame that forms a portion of the electrical device mounting assembly of FIG. 15.
Figure 17:
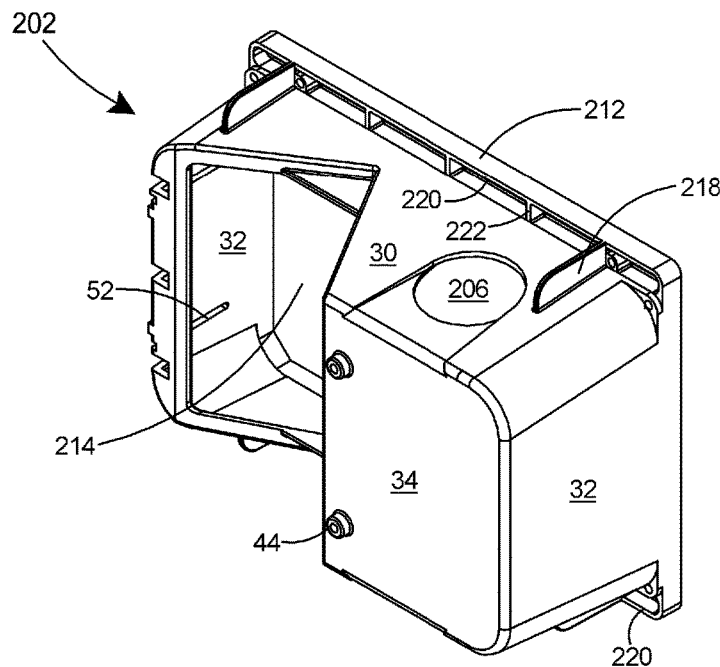
FIG. 17 is a rear perspective view of the mounting frame of FIG. 16.

Referring to FIGS. 16 and 17, the mounting frame 202 includes sidewalls 30, end walls 32, and a back wall 34 defining an enclosure 56 therein. One large open area 214 is provided in the back wall 34. One or more tabs 40 are provided on the corner wall 35 at the edge of the open area 214. A substantially V-shaped ledge 216 extends into the enclosure 56 from the sidewalls 30 at the periphery of the open area 214. The back wall 34 includes bosses 44 that are coincident with apertures 36 in the back wall and a plurality of slots 52 are provided in one end wall 32 of the mounting frame 202. To add rigidity between the flanges 212 and the walls of the mounting frame 202, there are provided a plurality of support arms 218 integral with and extending outward from the sidewalls 30. The flanges 212 include a rearward-extending lip 220 and a plurality of struts 222 extending between the lips 220 and the sidewalls 30.

Figure 18:
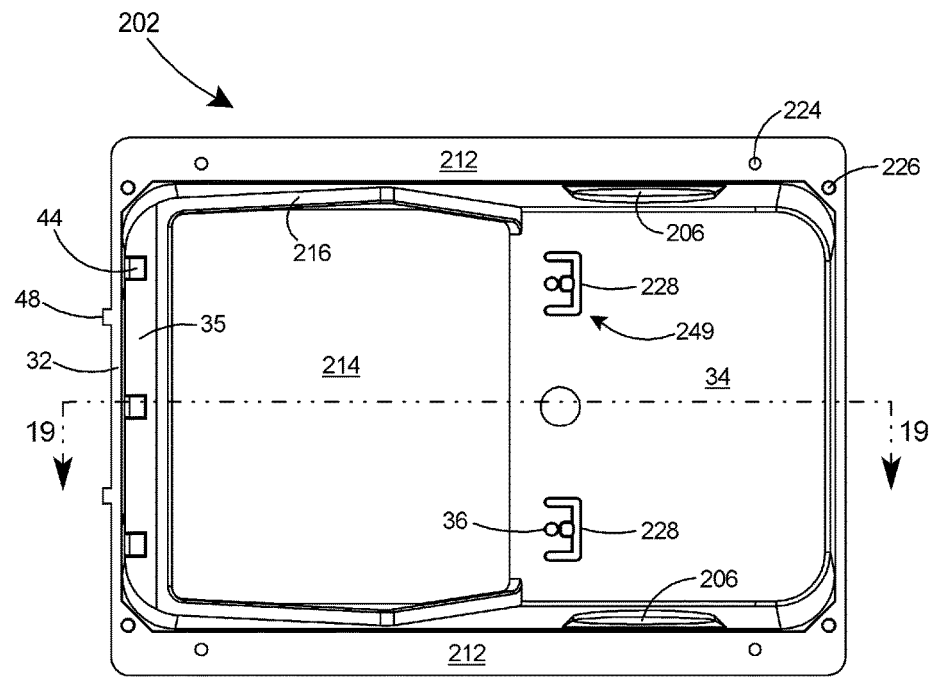
FIG. 18 is a front elevation view of the mounting frame of FIG. 16.
Figure 19:
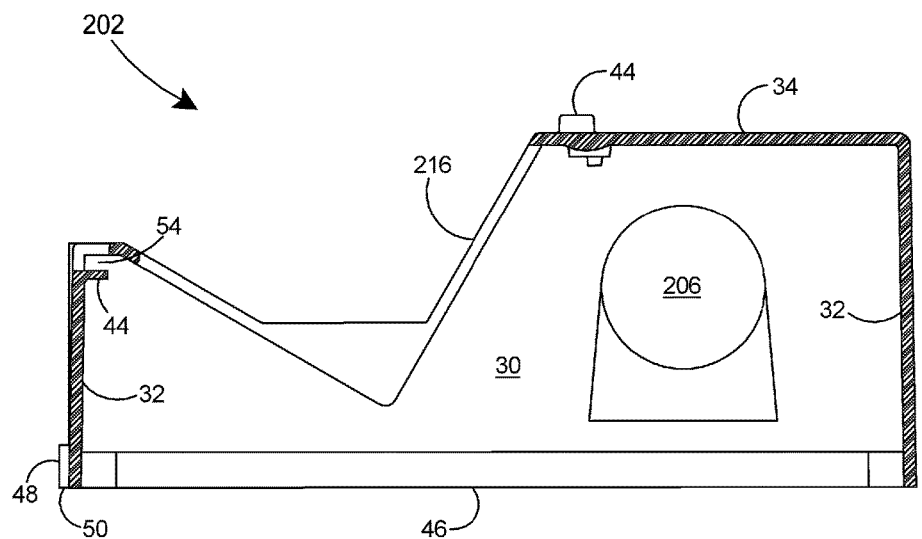
FIG. 19 is a sectional view of the mounting frame taken along line 19-19 of FIG. 18.

With reference to FIGS. 18 and 19, one end wall 32 of the mounting frame 202 includes integral spacers 48 extending outward from the end wall 32 and each include a flat front face 50 that is planar with the front face 46 of the mounting frame 202. The integral spacers 48 are preferably ½-inch in length and thereby enable an installer to rapidly and accurately orient the mounting frame 202 with respect to a stud (not shown) in a new work situation in order to allot the proper spacing for applying conventional ½-inch drywall over the stud. The flanges 212 include inner apertures 224 and outer apertures 226 therein. U-shaped ridges 228 extend from the back wall 34 adjacent to the apertures 36 in the back wall.

Figure 20:
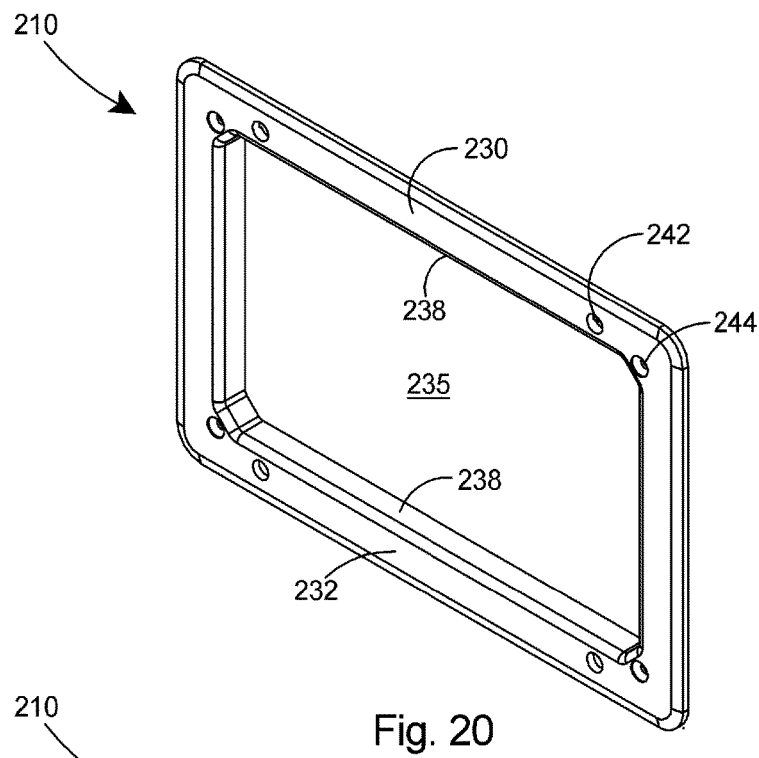
FIG. 20 is a front perspective view of a trim plate that forms a portion of the electrical device mounting assembly of FIG. 15.
Figure 21:
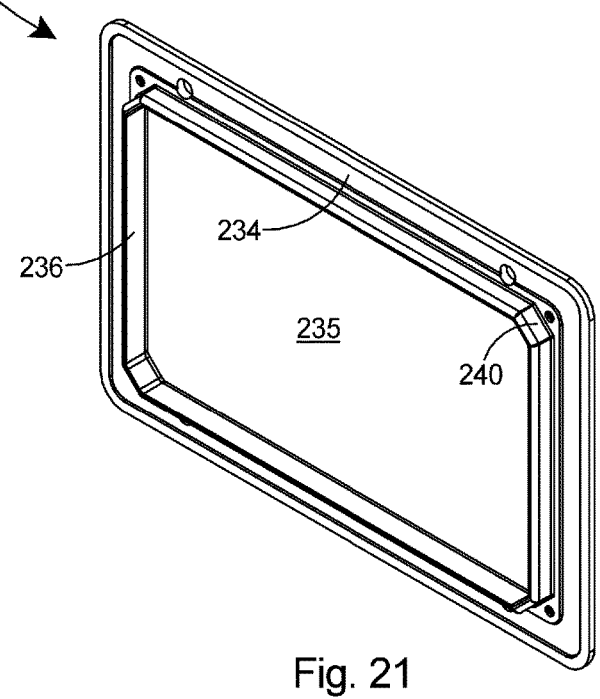
FIG. 21 is a rear perspective view of the trim plate of FIG. 20.

Referring to FIGS. 20 and 21, the trim plate 210 includes a frame 230 having a front side 232 and a rear side 234 with a central opening 235, and a peripheral wall 236 extending from the rear side 234 of the frame 230 around the inner periphery 238. The peripheral wall 236 includes truncated corners 240. The frame 230 portion of the trim plate 210 includes inner apertures 242 and outer apertures 244. The peripheral wall 236 is slightly smaller than the side walls 30 and end walls 32 in the mounting frame (see FIG. 15) and thus will nest within the opening formed by the side walls 30 and end walls 32 of the mounting frame 202.

As shown in FIG. 15, the electrical device mounting assembly 200 is used to provide electrical services to a flat panel TV or similar wall mounted electronic device. It has the advantages of recessing electrical components and all cables, wiring, and plug ends of cables within the wall. The electrical device mounting assembly 200 is an assembly of the mounting frame 202, an electrical component mounting device such as a power box 26, and the trim plate 210. The mounting frame 202 includes a mounting arrangement 247 for securing the mounting frame to a wall with the mounting arrangement 247 including a plurality of rotatable clamp arms 248. The rotatable clamp arms 248 are attached to the ends of mounting fasteners 250 that extend through oversize apertures 251 in the flanges 212 and are accessible from the front of the mounting frame.

The electrical device mounting assembly 200 is operated by first cutting a hole in the drywall of a building. The hole (not shown) is cut of a size and shape to accommodate the outer periphery of the mounting frame 202. A power box 26 is installed into the mounting frame 202 by sliding second lip 74 of power box 26 between tabs 40 and corner wall 35 of mounting frame 202 and rotating the power box 26 until the first frame 64 is flush against brace 58 and arms 72 of power box 26 nest within the U-shaped ridges 228 on the back wall 34 of the mounting frame 202. The U-shaped ridges 228 serve as an alignment arrangement 249 (see FIG. 22) for aligning the power box mounting device 26 with the aperture 36 in the back wall 34 of the mounting frame 202. Box fasteners 254 are then driven through arms 72 into the bores 36 of bosses 44 (see FIG. 23) to secure the power box 26 to the mounting frame 202. The tabs 40 and bosses 44 on the mounting frame 202, the arms 72 on the mounting device 26, and the box fasteners 254 form an attachment arrangement 253 (see FIG. 23) for securing the mounting device 26 to the mounting frame 202. Electrical cables (not shown) are pulled into the power box 26 on one end of the mounting frame 202 through knockouts 92 and low voltage cables are pulled into the other end of the mounting frame 202 through one or more ports 206.

After power box 26 is secured to the mounting frame 202, trim plate 210 is secured to the mounting frame 202 by driving plate fasteners 252 through the outer apertures 244 in the trim plate 210 into the outer apertures 226 in the flange 212 of the mounting frame 202. With trim plate 210 secured to the mounting frame 202, inner apertures 242 in trim plate 210 line up with the heads of the mounting fasteners 250 in the flange 212 of the mounting frame 202. As inner apertures 242 in trim plate 210 are of larger diameter than the heads of the mounting fasteners 250, the mounting fasteners 250 and attached clamp arms 248 can be rotated while the trim plate is secured to the mounting frame 202.

The mounting assembly 200 is then inserted into the hole until trim plate 210 is flush against the wall surface. Using a tool such as a screwdriver, the mounting fasteners 250 are then rotated clockwise until clamp arms 248 engage support arms 218 and thereafter with continued rotation are drawn toward flange 212 of mounting frame 202. Mounting fasteners 250 are rotated until clamp arms 248 are securely drawn against the back of the drywall (not shown) surrounding the hole in the wall. Thus a major advantage of the third embodiment of the electrical device mounting assembly 200 is that the mounting assembly can be mounted substantially anywhere on the wall as attachment to wall studs is not required. An operator can simply find the desired place on the wall for locating an electrical device, such as a flat panel TV, and simply cut a hole in the drywall to accommodate the periphery of the mounting frame 202. The length of the mounting frame 202 from end wall to end wall 32 is approximately 9-inches, enabling an installer to easily fit the mounting frame 202 anywhere between two studs. If stud anchoring is desired in addition to the clamp arms 248, the first end 204 of mounting frame 200 can be positioned flush against a stud and fasteners (not shown) can be driven through slots 52 in end wall 32.

Figure 22:
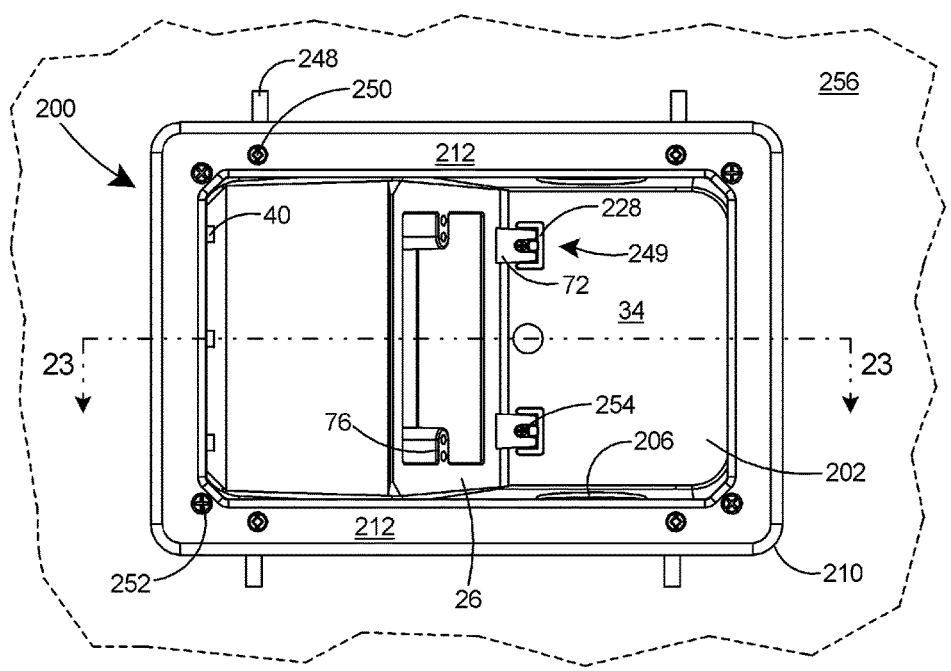
FIG. 22 is a front elevation view of the electrical device mounting assembly of FIG. 15.
Figure 23:
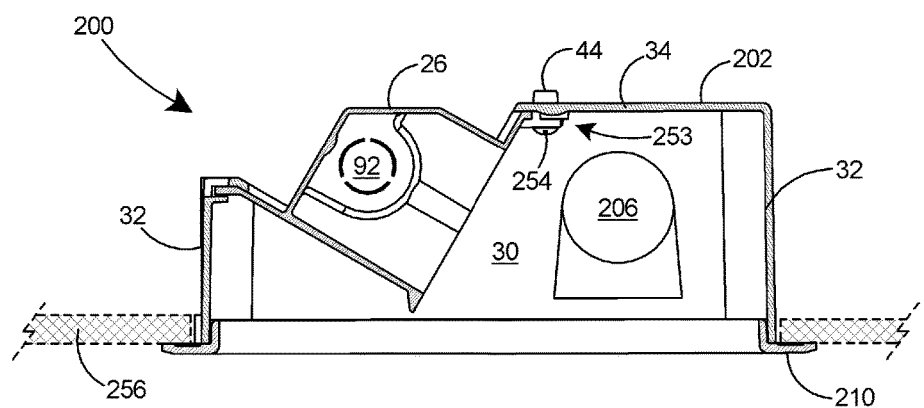
FIG. 23 is a sectional view of the electrical device mounting assembly taken along line 23-23 of FIG. 22.

With reference to FIGS. 22 and 23, electrical device mounting assembly 200 is depicted with a power box 26 secured therein to the mounting frame 202. The power box 26 is held to mounting frame 202 by tabs 40 on one end of the box and by box fasteners 254 secured through back wall 34 into bosses 44 integral with the back wall. Power box 26 includes connection points 76 for connection of a duplex receptacle (not shown) for providing power to the appliance it will be used in conjunction with. Audio visual or similar low voltage cables can be pulled into box through low voltage ports 206. As shown in FIG. 23, any wires or cables within mounting frame 202 will be recessed well within the wall 256 as well as any plug ends of power cords (not shown). As shown in FIG. 22, U-shaped ridges 228 of mounting frame 202 advantageously provide a seat for the arms 72 of a mounting device 26 to nest therein, thereby assisting in rapidly positioning the mounting device in mounting frame 202 and aligning the arms 72 with the bores 36 (see FIG. 18) in the back wall 34 of the mounting frame.

Figure 24:
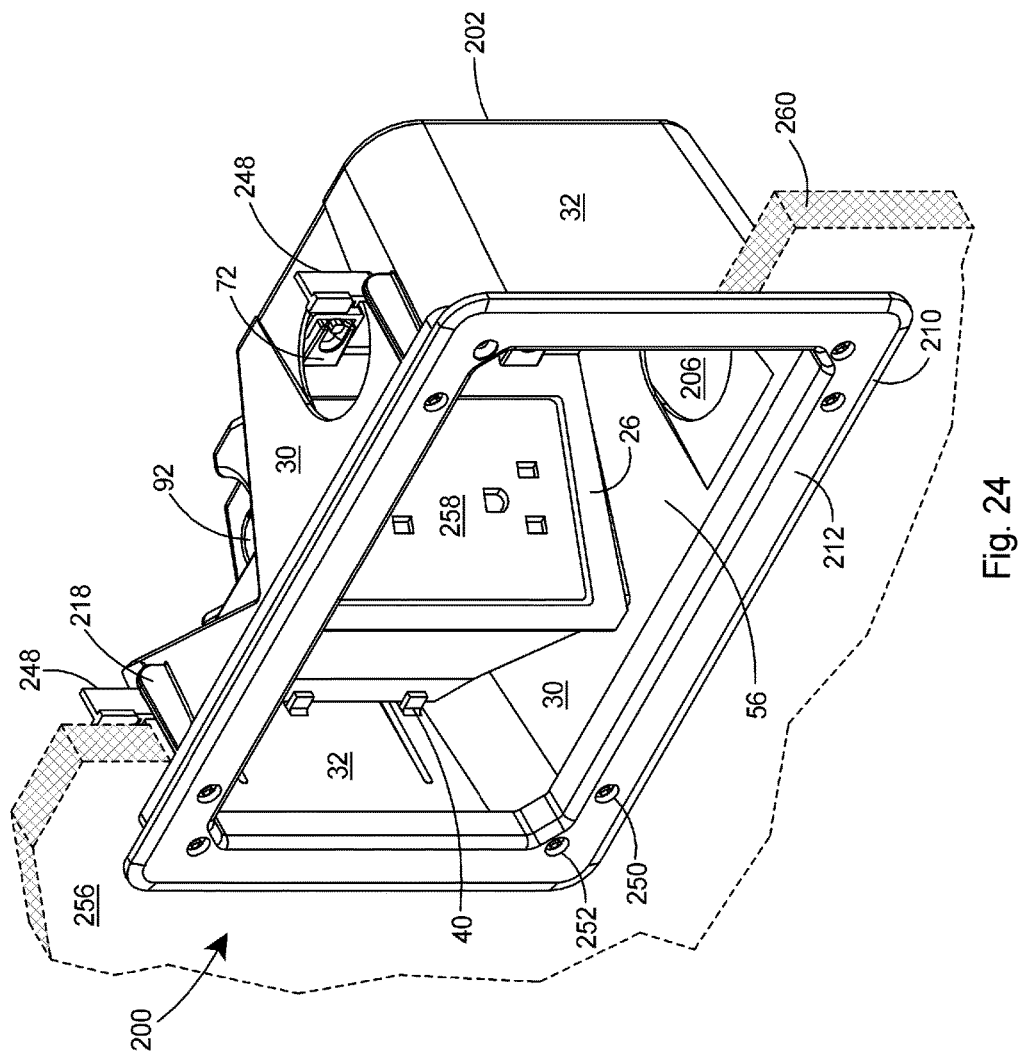
FIG. 24 is a perspective view of the third embodiment of the electrical device mounting assembly secured to a wall with a duplex receptacle installed therein and the trim plate secured to the mounting frame.

With reference to FIG. 24 there is shown an electrical device mounting assembly 200 installed on a wall with an electrical box 26 and the trim plate 210 secured to the mounting frame 202. All the required connections for a flat panel TV, including power, such as the duplex receptacle 258 shown, and AV cables, will be housed within the enclosure 56 of the mounting assembly 200. The plug end of electrical cords and all AV cables (not shown) will advantageously be recessed within the enclosure 56, thereby enabling a flat panel TV or similar electrical device to be mounted over the mounting assembly 200 and flush against the wall 256. Mounting the duplex receptacle 258 at an angle with respect to the front face of the mounting assembly 200 provides substantial volume within the enclosure 56 for recessing any plug ends of electrical cords that will be plugged into the power receptacle. Substantial volume is also provided on the opposite end of the enclosure to accommodate any low voltage cables entering the enclosure 56 through low voltage ports 206. The rotatable clamp arms 248 advantageously provide a means of rapidly mounting the assembly 200 to a wall 256 as all that is required is cutting a hole in the dry wall and tightening the clamp arms 248 against the drywall 260.

The various portions of the electrical device mounting assembly 200, including the mounting frame 202, low voltage mounting plate 24, high voltage box 26, and trim plate 210, may be constructed of metal or plastic. Most preferably, the mounting frame 202, low voltage mounting plate 24, high voltage box 26, and trim plate 210 are each molded in one piece of plastic. Suitable plastics include polycarbonate and polyvinylchloride.

Figure 25:
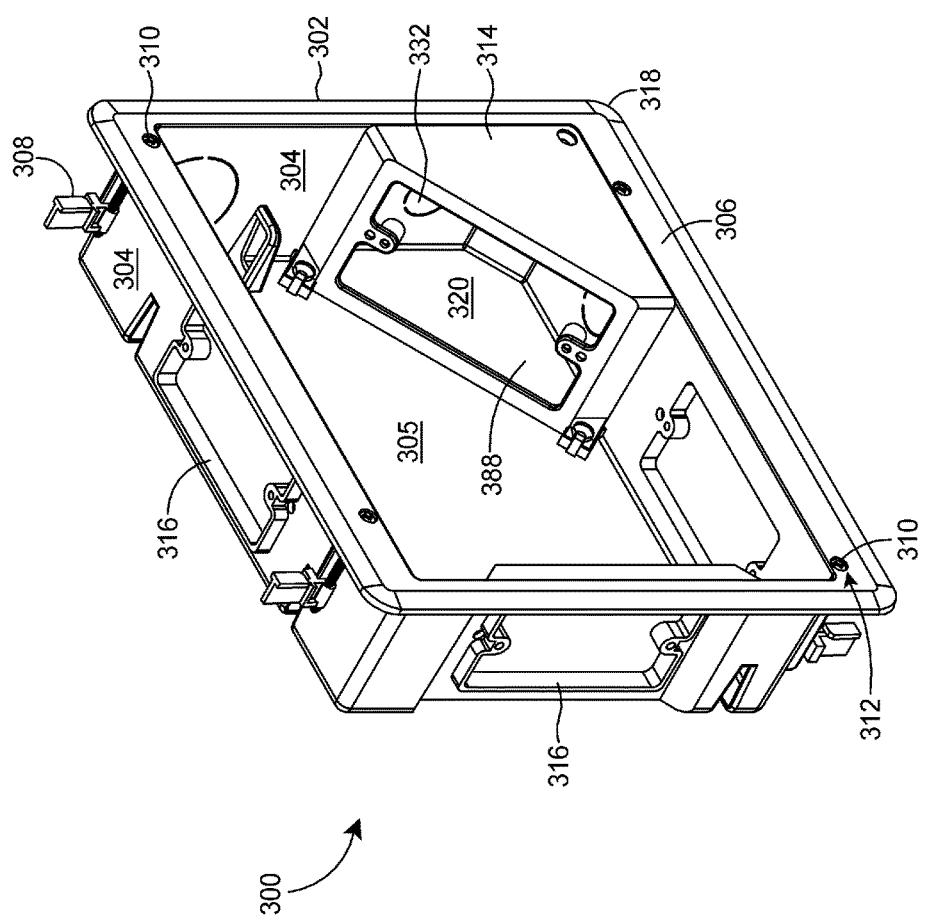
FIG. 25 is a front perspective view of a fourth and preferred embodiment of an electrical device mounting assembly according to the present invention.

With reference to FIG. 25 there is shown a fourth and preferred embodiment of an electrical device mounting assembly 300 according to the present invention. Electrical device mounting assembly 300 includes a mounting frame 302 with sidewalls 304, a rear wall 305, a flange 306, and rotatable clamp arms 308 that are attached to the ends of mounting fasteners 310 that extend through apertures 312 in the flange 306 and are accessible from the front of the mounting frame 302. The mounting frame 302 further includes an electrical box 314 and at least one low voltage mount 316.

Figure 26:
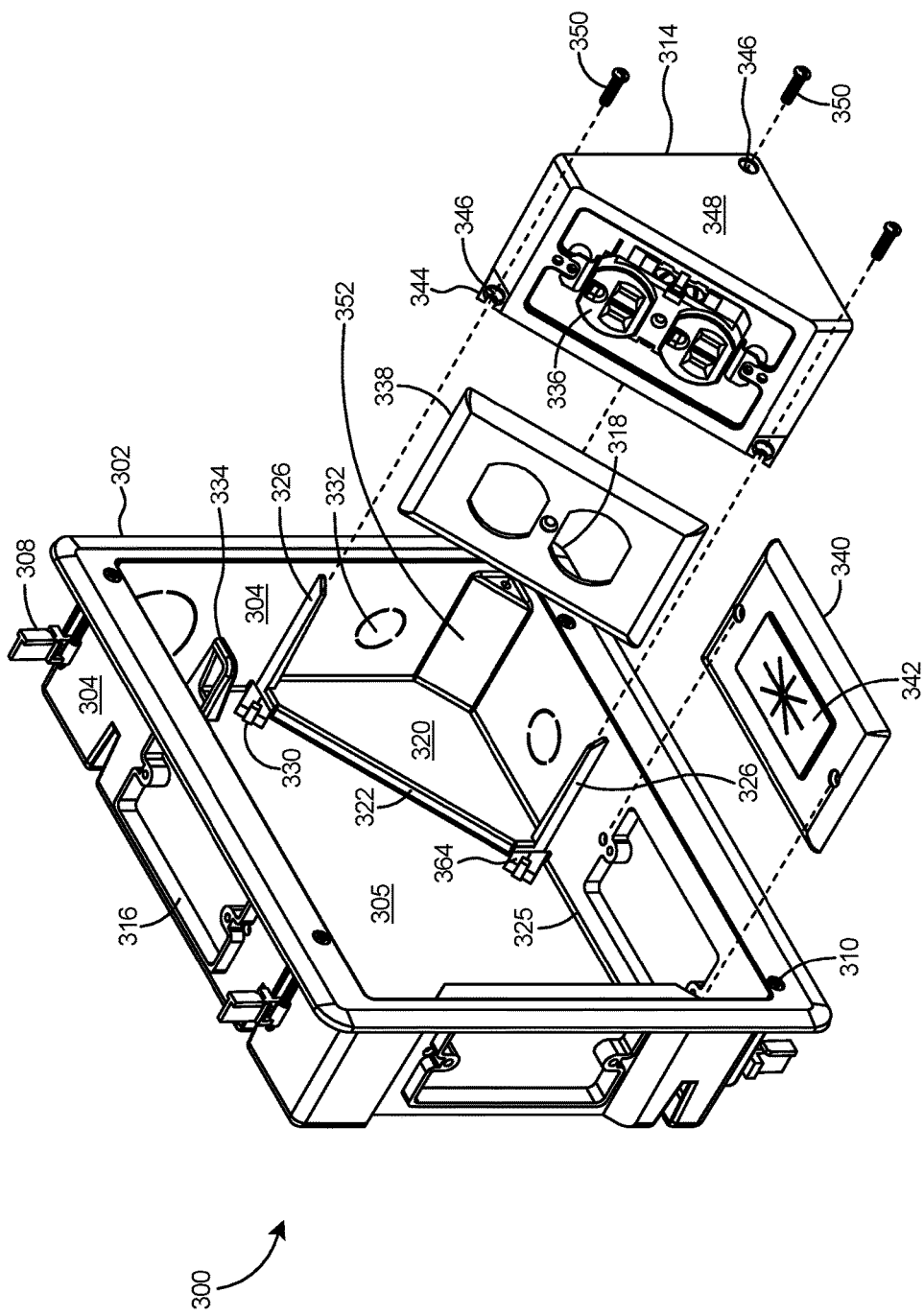
FIG. 26 is an exploded perspective view of the electrical device mounting assembly of FIG. 25 with a high voltage adapter and low voltage mounting plate exploded away from the mounting frame.

As shown in FIG. 26, the rear wall 305 at one corner 318 of the mounting frame 302 includes a raised area 320 that includes a ledge 322 that is at a 45° angle with respect to the sidewalls 304. Electrical box 314 is a partial electrical box until secured to the mounting frame 302 as raised area 320 closes the partial electrical box after it is secured to the mounting frame 302 as will be described herein below. Ledge 322 further includes two end portions 324 that are orthogonal to the sidewalls 304 at their juncture 325 with the sidewalls. A substantially L-shaped rib 326 extends along each of the sidewalls 304 and joins the end portion 324 of the ledge. The ledge 322, end portions 324, and ribs 326 form a bracket 328 for supporting the electrical box 314. Posts 330 extending from the rear wall 305 provide an aligning mechanism for the electrical box 314 as it is slid into the mounting frame 302. The sidewalls 304 include one or more knockouts 332 and one or more cable tie-offs 334 at the juncture 325 of the rear wall and sidewalls. The electrical box 314 includes a duplex receptacle 336 with a faceplate 338 for mounting a high voltage component such as the duplex receptacle 336 shown and a cable entry device 340 with a flexible slotted cover 342 to provide a port for passage of low voltage cables into the mounting frame.

Electrical box 314 includes outward extending tabs 344 with apertures 346 therein and an outer wall 348 with an aperture 346. Electrical box 314 is secured to mounting frame 302 by fasteners 350 secured through apertures 346. Mounting frame 302 includes a bridge 352 extending between the two sidewalls 304 at corner 318. Bridge 352 includes a front face 354 that includes an aperture 356 therein for receipt of fasteners 350.

Figure 27:
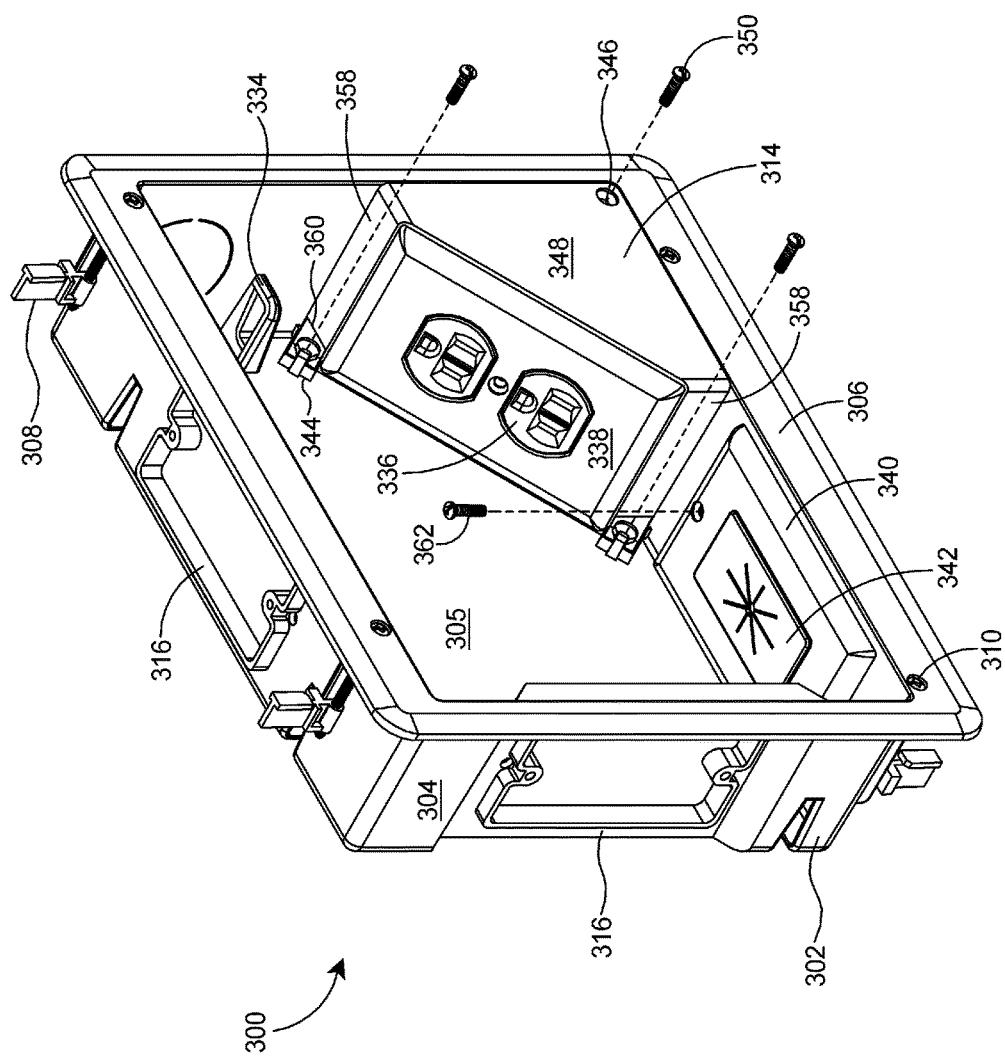
FIG. 27 is a perspective view of a fully assembled electrical device mounting assembly including a duplex receptacle and a low voltage mounting plate.

With reference to FIG. 27, electrical box 314 further includes short sidewalls 358 extending from the outer wall 348. The tabs 344 extend from the ends 360 of the short sidewalls 358. Flexible slotted covers 342, one of which is shown in FIG. 27, may be secured to the low voltage mount 316 by fasteners 362 as shown.

Figure 28:
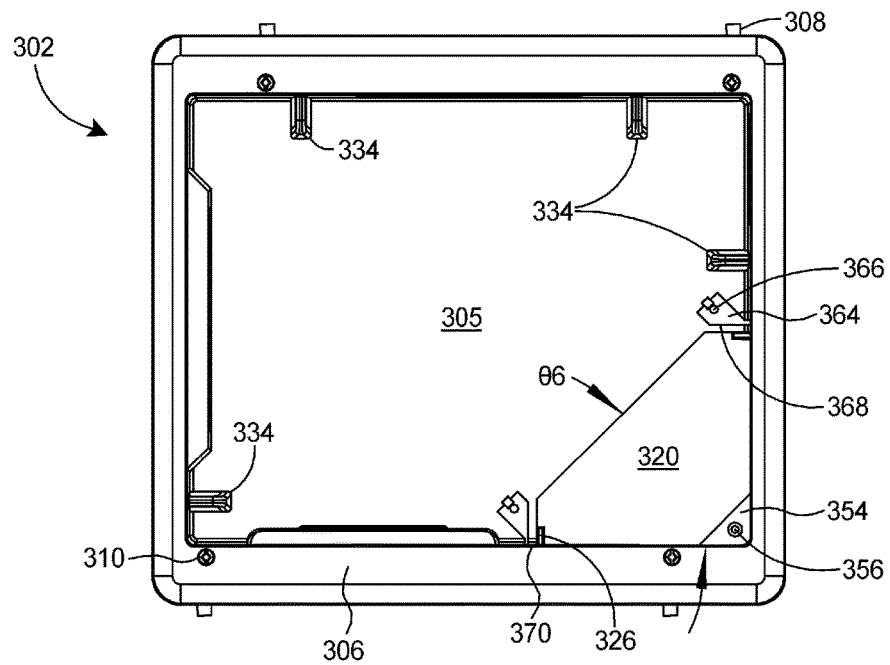
FIG. 28 is a front view of the mounting frame portion of the electrical device mounting assembly of FIG. 25.
Figure 29:
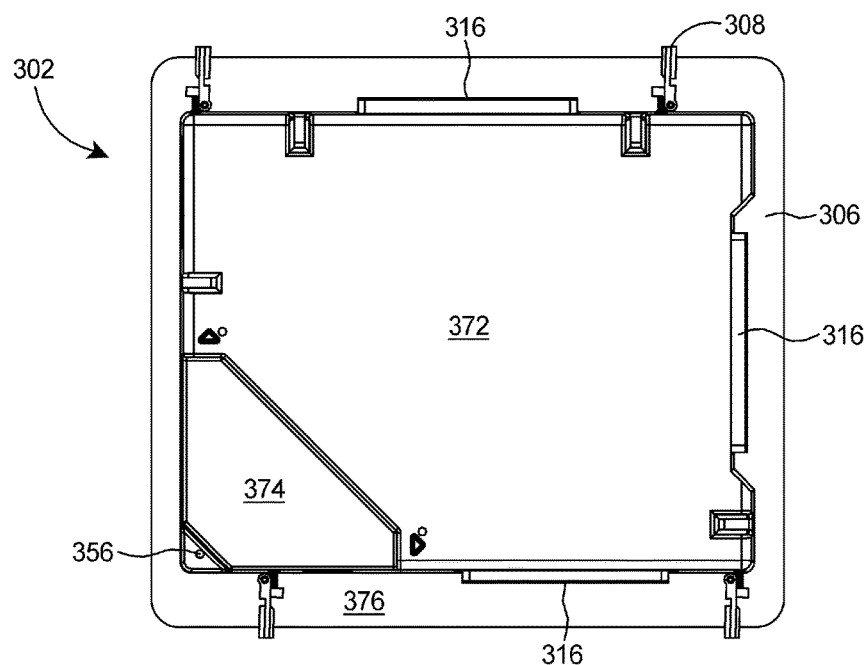
FIG. 29 is a rear view of the mounting frame portion of the electrical device mounting assembly of FIG. 25.

Referring to FIG. 28, the rear wall 305 of the mounting frame 302 includes bosses 364 thereon with bores 366 therein. Bosses 364 provide a thick wall section on the rear wall 305 that enable the bores 366 to accept a threaded fastener (not shown) therein. The bosses 364 include flat sides 368 on their sides facing the end portions 324 of the ledge 322. A groove 370 is provided between the flat sides 368 of the bosses 364 and the end portions 324 of the ledge 322 with the groove 370 of a width to accept the short sidewalls 358 (see FIG. 27) of the electrical box 314. As shown in FIG. 29, the rear side 372 of the mounting frame 302 includes a recessed area 374 formed therein. Flange 306 includes a rear surface 376 that will fit flush against the sheetrock of a wall (not shown) when the electrical device mounting assembly is installed.

Figure 30:
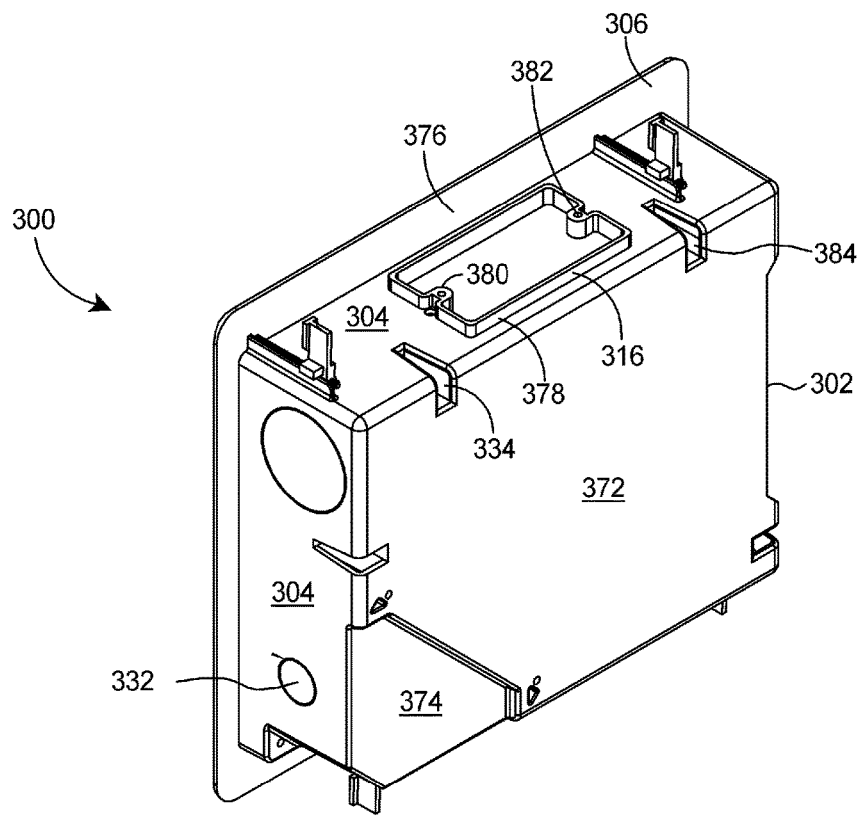
FIG. 30 is a rear perspective view of the electrical device mounting assembly of FIG. 25.

With reference to FIG. 30, each low voltage mount 316 includes a raised periphery 378 extending from the outer surface of the sidewall 304. Raised outer periphery 378 includes bosses 380 with bores 382 therein for accepting fasteners from a low voltage mounting plate (not shown). Notches 384 are formed at the outer juncture 386 of rear surface 376 and sidewalls 304 at the locations where cable tie-offs 334, a portion of which are in view, are provided within the mounting frame 302.

Figure 31:
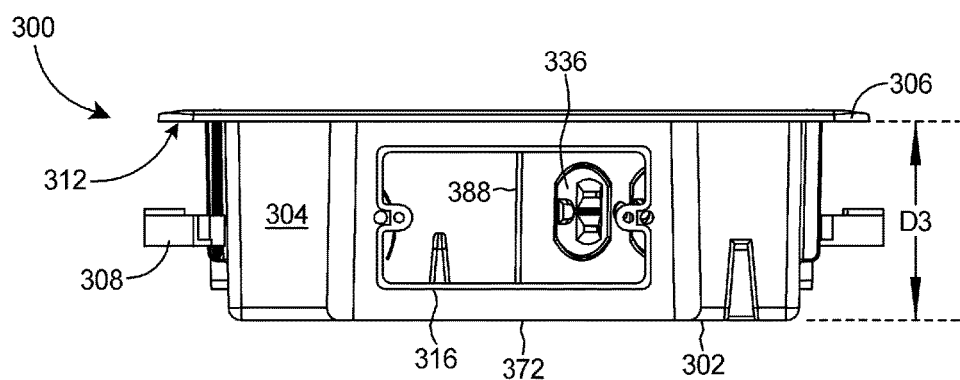
FIG. 31 is a side view of the fully assembled electrical device mounting assembly as viewed from the top side of FIG. 27.

With reference to the side view of the electrical device mounting assembly 300 in FIG. 31, by incorporating a portion of the rear wall 305 such as raised area 320 (see FIG. 25) to provide an enclosed electrical box 388 the depth D3 of the mounting frame 302 from the rear surface 376 of the flange is substantially reduced. Thus, as compared to the 3.8-inch depth of the mounting frame of the first embodiment described hereinabove, the depth of mounting frame 302 of the preferred embodiment is preferably a maximum of 3.0-inches and most preferably a maximum of 2.84-inches. Thus electrical device mounting assembly 300 can be used to mount electrical devices in applications such as recreational vehicles (RVs), in which the walls are typically formed with 2×3-inch studs. The nominal depth of the 2×3-inch stud is 2.5-inches. Thus, with a standard 0.5-inch thick layer of sheetrock secured to the studs, the wall cavity thickness will be 3.0-inches. The mounting assembly 300 with 2.84-inch depth can therefore be used to mount low and high voltage components on walls with substantially shallow wall cavities.

With reference to FIGS. 25-27, to operate the electrical device mounting assembly 300 of the present invention, an installer cuts a hole in the sheetrock (not shown) in a desired location for mounting a flat panel TV or similar electronic device. The hole is cut slightly larger than the outer periphery of the mounting frame's sidewalls 304, but smaller than the outer periphery of flange 306. High and low voltage cables are pulled into the mounting assembly 300 through the appropriate openings. Low voltage cables (not shown) are pulled through flexible slotted cover 342 of cable entry device 340 (see FIG. 27). High voltage cables (not shown) are pulled through knockout 332, its conductors are wired to duplex receptacle 336, and duplex receptacle is secured to electrical box 314. Electrical box 314 is then slid into mounting frame 302 and secured to bosses 364 by fasteners 350 (see FIG. 26). Mounting fasteners 310 of mounting assembly 300 are then turned counterclockwise to position rotatable flags 308 against sidewalls 304. The mounting frame 302 is then inserted into the hole in the sheetrock until rear surface of flange 306 is flush with the sheetrock. Mounting fasteners 310 are then rotated clockwise until flags 308 are tightened against the sheetrock to secure the mounting assembly 300 to the wall. A flat panel TV or other electronic device can then be mounted over the mounting assembly 300, which is substantially flush with the wall as the thickness of the flange is less than 0.16-inch. As shown in FIG. 27, tabs 344 advantageously extend from the rear portion of short sidewalls 358 and therefore faceplate 338 can be secured to the electrical box 314 prior to securing the electrical box portion to the mounting frame 302. Thus electrical box 314 can be secured to mounting frame 302 after wiring connections are completed therein and faceplate 338 is secured over duplex receptacle 336. If the interior of electrical box 314 must be accessed at a later time, it can be easily disassembled from the mounting frame 302 by removing the fasteners 350 and later reassembling to the mounting frame.

Having thus described the invention with reference to a preferred embodiment, it is to be understood that the invention is not so limited by the description herein but is defined as follows by the appended claims.

What is claimed is:

1. An electrical device mounting assembly comprising: a mounting frame including side walls, end walls, a flange including a rear surface, and a rear wall defining an enclosure therein; wherein said sidewalls comprise a first sidewall and a second sidewall and said end walls comprise a first end wall and a second end wall; said mounting frame including a depth defined by the distance between said rear surface of said flange and said rear wall of said mounting frame; said mounting frame including a mounting arrangement for securing said mounting frame to a wall; a high voltage mounting device for securing a high voltage electrical component within said enclosure; said high voltage mounting device is insertable and securable within said enclosure of said mounting frame; an attachment arrangement for securing said high voltage mounting device within said enclosure; a low voltage mount on said first side wall of said mounting frame; said low voltage mount includes a raised outer periphery, said raised outer periphery including a periphery wall extending around the outer periphery of said low voltage mount and outward from said first side wall of said mounting frame; said high voltage mounting device residing within said depth of said mounting frame; said high voltage mounting device comprising a partial electrical box having an outer wall and a face wall extending between said rear wall, said second side wall, and said first end wall of said mounting frame, said face wall including an opening therein and a cover plate for closing the opening; said face wall of said electrical box is at an oblique angle with respect to said end walls and said side walls of said mounting frame; and said face wall of said electrical box extending from said rear wall of said mounting frame to said rear surface of said flange and wherein said attachment arrangement includes substantially L-shaped ribs extending along said second side wall and said first end wall, respectively, and a ledge including two end portions extending from said rear wall of said mounting frame, wherein the two end portions of the ledge and the substantially L-shaped ribs join together to form a bracket for supporting the partial electrical box.

2. The electrical device mounting assembly of claim 1 wherein said mounting arrangement includes a plurality of rotatable clamp arms extending through said mounting frame.

3. The electrical device mounting assembly of claim 1 wherein said mounting arrangement includes a plurality of oversize apertures in said flange of said mounting frame; a plurality of mounting fasteners extending through said oversize apertures in said flanges; and a rotatable clamp arm attached to each of said mounting fasteners.

4. The electrical device mounting assembly of claim 1 wherein said high voltage mounting device a raised area on said rear wall of said mounting frame, said raised area and said first end walls and said second side wall combining with said partial electrical box to form a closed electrical box within said enclosure of said mounting frame.

5. The electrical device mounting assembly of claim 1 wherein said low voltage mount includes a boss with a bore therein.

6. The electrical device mounting assembly of claim 4 including posts including an aperture therein at each end portion of said ledge, and said posts extending outward from said rear wall of said mounting frame.

7. The electrical device mounting assembly of claim 6, including outward extending tabs on said partial electrical box; apertures in said outward extending tabs; and said apertures in said outward extending tabs adapted for receipt of fasteners for securing said partial electrical box to said mounting frame.

8. The electrical device mounting assembly of claim 4 including an aperture in said outer wall of said partial electrical box; and said aperture in said outer wall of said partial electrical box adapted for receipt of a fastener for securing said partial electrical box to said mounting frame.

9. The electrical device mounting assembly of claim 1 including one or more cable tie-offs at the juncture of said rear wall and said side walls.

10. An electrical device mounting assembly comprising: a mounting frame including side walls, end walls, a flange including a rear surface, and a rear wall defining an enclosure therein; wherein said sidewalls comprise a first sidewall and a second sidewall and said end walls comprise a first end wall and a second end wall; said mounting frame including a depth defined by the distance between said rear surface of said flange and said rear wall of said mounting frame; said mounting frame including a mounting arrangement for securing said mounting frame to a wall; a high voltage mounting device for securing a high voltage electrical component within said enclosure; said high voltage mounting device insertable and securable within said enclosure of said mounting frame; an attachment arrangement for securing said high voltage mounting device within said enclosure; a low voltage mount on said first side wall of said mounting frame; said low voltage mount includes a raised outer periphery, said raised outer periphery including a periphery wall extending around the outer periphery of said low voltage mount and outward from said first side wall of said mounting frame; said high voltage mounting device residing within said depth of said mounting frame; wherein said high voltage mounting device comprising a partial electrical box having an outer wall and a face wall; said face wall including an opening therein and a cover plate for closing the opening; said face wall of said electrical box is at an oblique angle with respect to said end walls and said side walls of said mounting frame; and said face wall of said electrical box extending from said rear wall of said mounting frame to said rear surface of said flange and wherein said attachment arrangement includes substantially L-shaped ribs extending along said second side wall and said first end wall, respectively, and a ledge including two end portions extending from said rear wall of said mounting frame, wherein the two end portions of the ledge and the substantially L-shaped ribs loin together to form a bracket for supporting the partial electrical box and a raised area projecting forward into said enclosure from said rear wall of said mounting frame, said raised area and said first end wall and said second side wall combining with said partial electrical box form a closed electrical box within said enclosure of said mounting frame.

11. An electrical device mounting assembly comprising: a mounting frame including side walls, end walls, a flange including a rear surface, and a rear wall defining an enclosure therein; wherein said sidewalls comprise a first sidewall and a second sidewall and said end walls comprise a first end wall and a second end wall; said mounting frame including a depth defined by the distance between said rear surface of said flange and said rear wall of said mounting frame; said mounting frame including a mounting arrangement for securing said mounting frame to a wall; a high voltage mounting device for securing a high voltage electrical component within said enclosure; said high voltage mounting device insertable and securable within said enclosure of said mounting frame; an attachment arrangement for securing said high voltage mounting device within said enclosure; a low voltage mount on said first side wall of said mounting frame; said low voltage mount includes a raised outer periphery, said raised outer periphery including a periphery wall extending around the outer periphery of said low voltage mount and outward from said first side wall of said mounting frame; said high voltage mounting device residing within said depth of said mounting frame; and a corner and a bridge on said mounting frame, said bridge providing a means for securing said high voltage mounting device to said mounting frame and said high voltage mounting device comprising a partial electrical box having an outer wall and a face wall extending between said rear wall, said second side wall, and said first end wall of said mounting frame, said face wall including an opening therein and a cover plate for closing the opening; said face wall of said electrical box is at an oblique angle with respect to said end walls and said side walls of said mounting frame; and said face wall of said electrical box extending from said rear wall of said mounting frame to said rear surface of said flange and wherein said attachment arrangement includes substantially L-shaped ribs extending along said second side wall and said first end wall, respectively, and a ledge including two end portions extending from said rear wall of said mounting frame, wherein the two end portions of the ledge and the substantially L-shaped ribs loin together to form a bracket for supporting the partial electrical box.

* * * * *